(12) United States Patent
Tomita et al.

(10) Patent No.: US 9,072,024 B2
(45) Date of Patent: Jun. 30, 2015

(54) WIRELESS COMMUNICATION SYSTEM

(71) Applicant: FUJITSU LIMITED, Kawasaki-shi, Kanagawa (JP)

(72) Inventors: Tetsuo Tomita, Setagaya (JP); Masanori Hashimoto, Yokohama (JP); Bun Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/057,452

(22) Filed: Oct. 18, 2013

(65) Prior Publication Data

US 2014/0051450 A1 Feb. 20, 2014

Related U.S. Application Data

(63) Continuation of application No. PCT/JP2011/002390, filed on Apr. 22, 2011.

(51) Int. Cl.
*H04W 36/38* (2009.01)
*H04W 36/00* (2009.01)
*H04W 84/04* (2009.01)

(52) U.S. Cl.
CPC .......... *H04W 36/38* (2013.01); *H04W 36/0055* (2013.01); *H04W 84/047* (2013.01)

(58) Field of Classification Search
USPC .......... 455/436, 437, 439, 441; 370/329, 331
See application file for complete search history.

(56) References Cited

U.S. PATENT DOCUMENTS

2011/0269495 A1   11/2011   Hapsari et al.
2012/0069735 A1   3/2012    Tajima et al.

FOREIGN PATENT DOCUMENTS

JP   2010-157908 A   7/2010
JP   2010-183645 A   8/2010
WO   WO 2010/146661 A1   12/2010
WO   WO 2011/018890 A1   2/2011

OTHER PUBLICATIONS

International Search Report issued in PCT/JP2011/002390, dated Aug. 2, 2011, 3 pages.
Japanese Office Action issued Apr. 14, 2015; Japanese Application No. 2013-510743.
Catt, Discussion on handover performance, 3GPP TSG RAN WG2 Meeting #68bis, Valencia, Spain, Jan. 18-22 2010, R2-100177, pp. 1-6.
Research in Motion UK Limited, Joint PDCP protocols on Uu and Un interfaces to improve type-I relay handover, 3GPP TSG RAN WG2 Meeting #66bis, Los Angeles, USA, Jun. 29-Jul. 3, 2009, R2-093735, pp. 1-9.

*Primary Examiner* — Sam Bhattacharya
(74) *Attorney, Agent, or Firm* — Arent Fox LLP

(57) ABSTRACT

A wireless communication system includes a first relay station that includes a first storage and performs wireless communication with a first base station coupled to an exchange by a wire, and a mobile device that performs wireless communication with the first relay station. The first relay station receives first data with a first sequence number from the first base station, and stores the first data with a second sequence number into the first storage, the first relay station selects a first node as a handover destination, and when the first node is a second base station coupled to the exchange by a wire, the first relay station receives second data with a third sequence number from the first base station, and transmits the first data with the second sequence number and the second data with a fourth sequence number continuous to the second sequence number to the second base station.

11 Claims, 25 Drawing Sheets

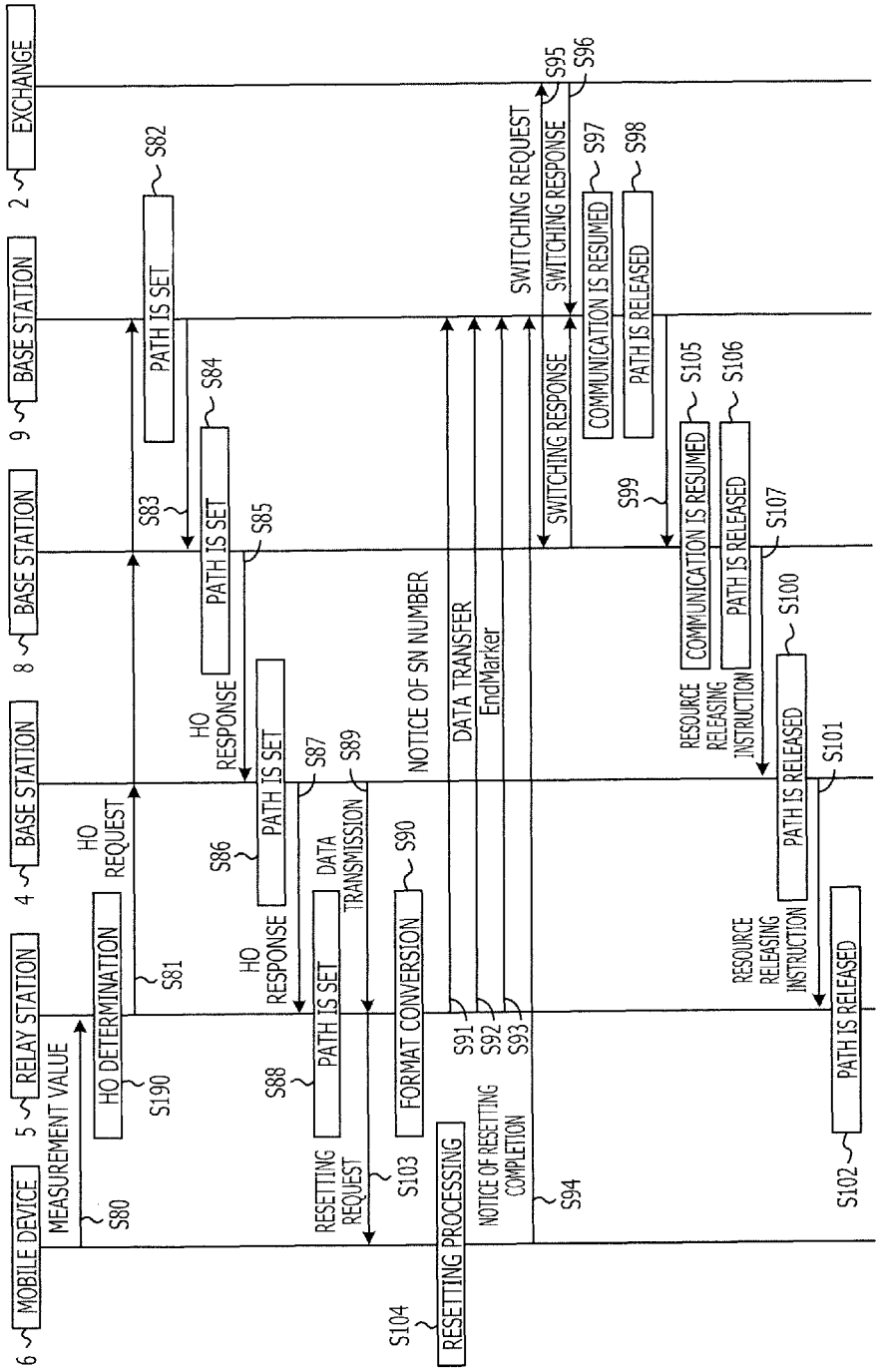

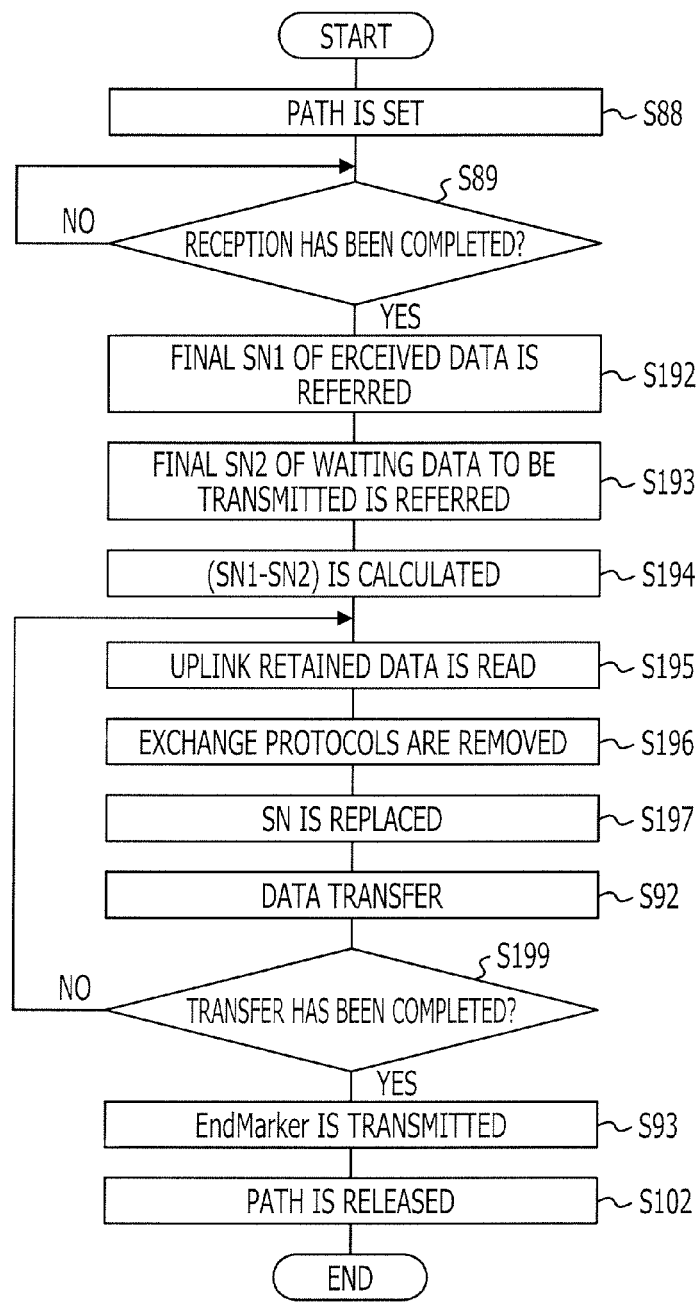

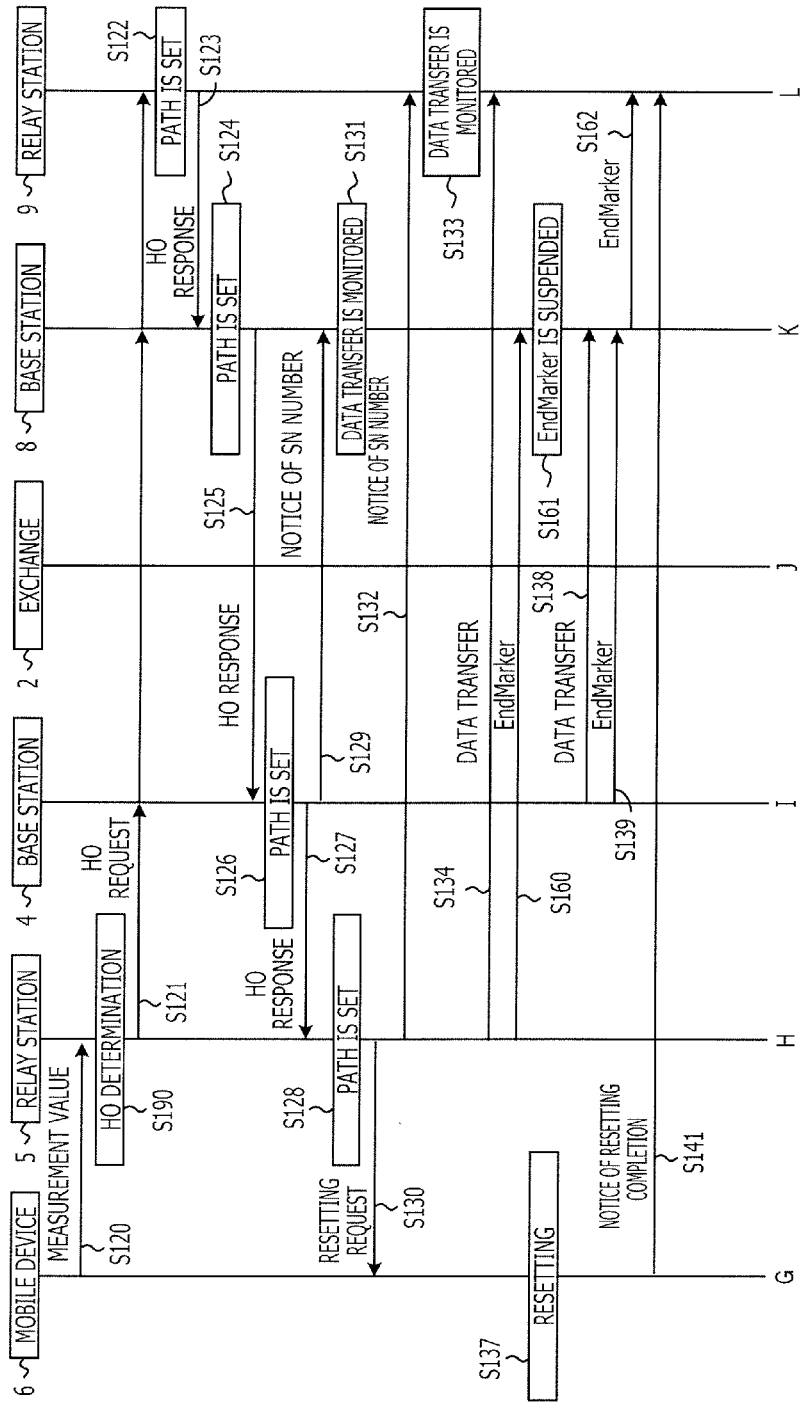

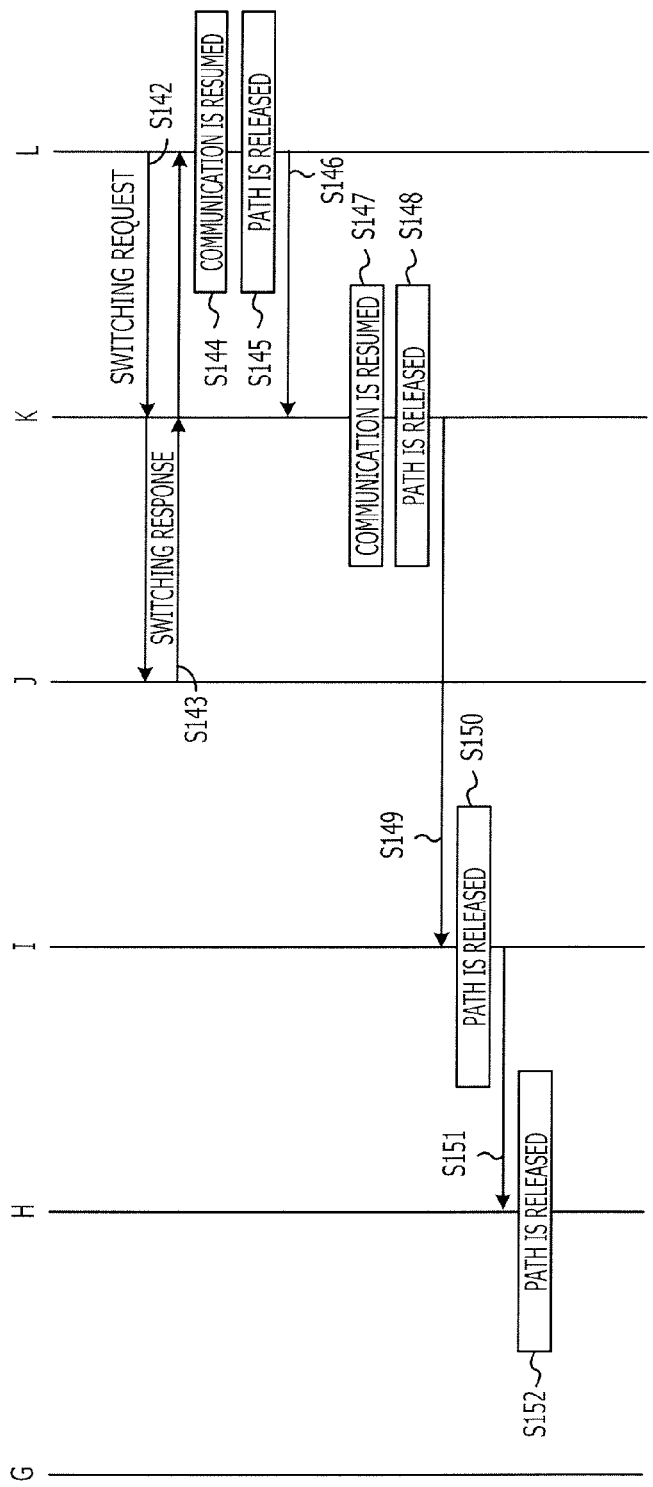

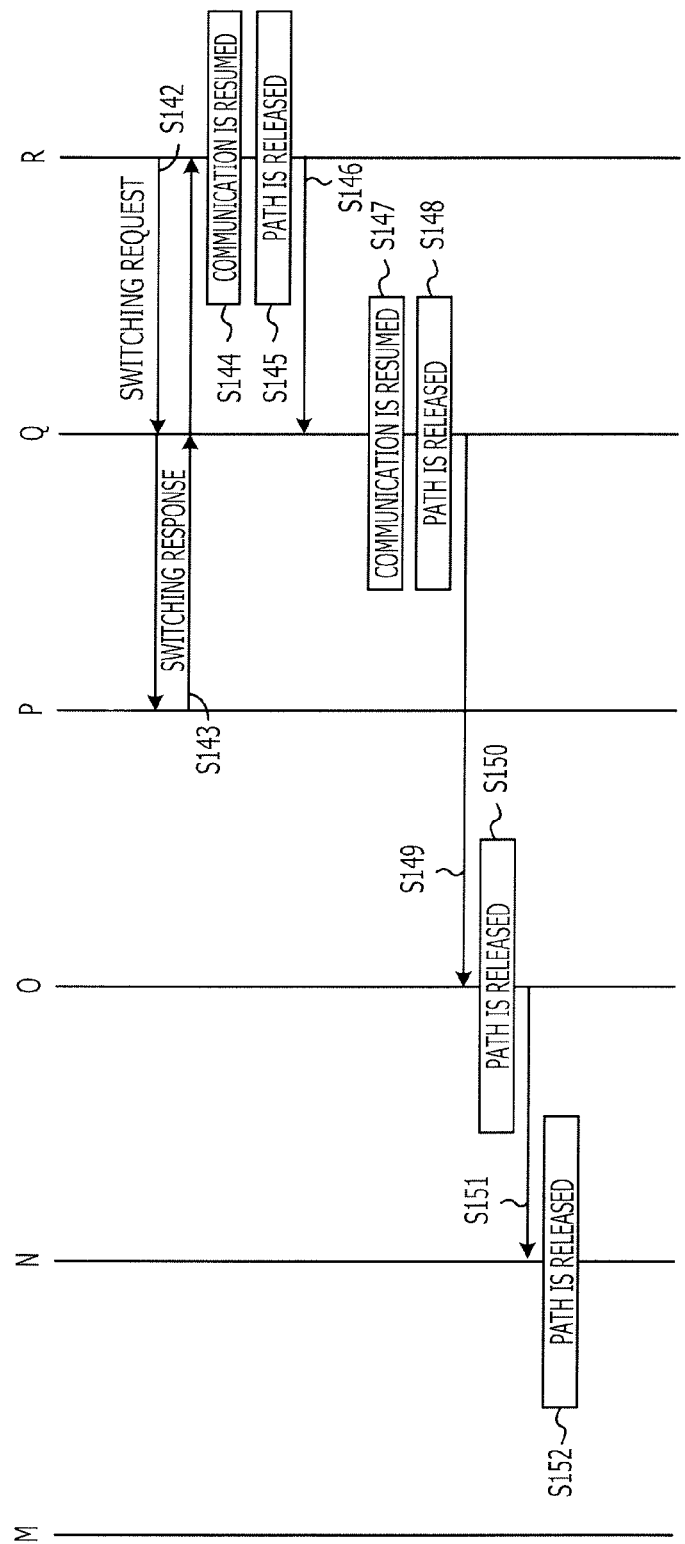

WIRELESS COMMUNICATION SYSTEM

CROSS-REFERENCE TO RELATED APPLICATION

This application is a continuation application of International Application PCT/JP2011/002390 filed on Apr. 22, 2011 and designated the U.S., the entire contents of which are incorporated herein by reference.

FIELD

The present invention relates to a communication system controlling wireless communication.

BACKGROUND

A communication system controlling wireless communication includes a network coupled to an exchange and a plurality of base stations coupled to the network. One base station communicates with a plurality of mobile devices.

An area in which communication with a mobile device is ensured owing to one base station is called a cell. It is desirable that the cell covers a whole area in which a mobile device is predicted to move. However, owing to a geographic condition or a communication data amount, an area occurs that may not be covered only by the base station.

In order to supplement the area not covered only by the base station, a relay station is used. The relay station is coupled to the base station. A mobile device, which exists in an area covered by the relay station, accesses the exchange through the relay station, the base station, and the network. A device such as the relay station or the base station, which is located at a network coupling point, is called a node.

In wireless communication in which a communication condition temporally changes, data communication is performed while the measurement value of a radio wave is sent from a mobile device side and a receiving side confirms a communication environment on the basis of the measurement value. When a plurality of nodes exist between the mobile device and the exchange, and a communication distance between relay points is long, a signal propagation delay time between the mobile device and the exchange becomes large. When the signal propagation delay time has become large, confirmation processing for the communication environment with respect to the measurement value becomes delayed. The delay of the confirmation processing results in the deterioration of latency.

In order to avoid the deterioration of latency, there has been a technique in which data communication is performed using independent communication protocols between nodes. Using independent communication protocols between nodes, the sections of data communication individually become short. By shortening the sections of data communication, it may be possible to speed up the confirmation processing for the communication environment with respect to the measurement value.

When a mobile device located in a cell covered by one relay station moves to a cell covered by another base station, handover processing occurs in a communication system so that data communication between the mobile device and the exchange is not disconnected. As related arts, Japanese Laid-Open Patent Publication No. 2010-183645 and Japanese Laid-Open Patent Publication No. 2010-157908 are known.

SUMMARY

According to an aspect of the invention, a wireless communication system includes a first relay station that includes a first storage and performs wireless communication with a first base station coupled to an exchange by a wire, and a mobile device that performs wireless communication with the first relay station. The first relay station receives first data with a first sequence number from the first base station, and stores the first data with a second sequence number into the first storage, the first relay station selects a first node as a handover destination, and when the first node is a second base station coupled to the exchange by a wire, the first relay station receives second data with a third sequence number from the first base station, and transmits the first data with the second sequence number and the second data with a fourth sequence number continuous to the second sequence number to the second base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are schematic diagrams of data processing operations in individual nodes when handover processing has occurred in the wireless communication system 1a.

FIG. 15 is a sequence diagram of the wireless communication system 1b when a mobile device is handed over from a relay station to a relay station.

FIG. 16 is a processing flowchart diagram of a relay station serving as a handover source, in the sequence diagram in FIG. 15.

FIGS. 20A and 20B are second sequence diagrams when data transfer processing operations in FIGS. 17A and 17B are performed in the wireless communication system 1b.

FIGS. 21A and 21B are third sequence diagrams when data transfer processing operations in FIGS. 17A and 17B are performed in the wireless communication system 1b.

DESCRIPTION OF EMBODIMENTS

When handover processing is performed in a communication system including relay stations, in some cases retained data occurs in a base station and the relay station depending on the timing of the processing. The retained data means data remaining in a buffer within a node without being transmitted, in the node serving as a switching source in the handover processing. When the retained data is discarded and data is retransmitted from a transmission source again, the processing load of a device occurs that is due to the retransmission processing. By transferring the retained data to a handover destination and resuming communication after that, it may be possible to reduce the processing load due to the retransmission processing. In the case of the communication system including relay stations, the optimum transfer destination of the retained data, a transfer timing, conversion processing for a data format, and so forth become different depending on which of the base station and the relay station configures a cell serving as the movement destination of a mobile device.

Hereinafter, the present embodiments will be described. In addition, the combination of configurations in the individual embodiments is also included in an embodiment of the present invention.

Figure 1:
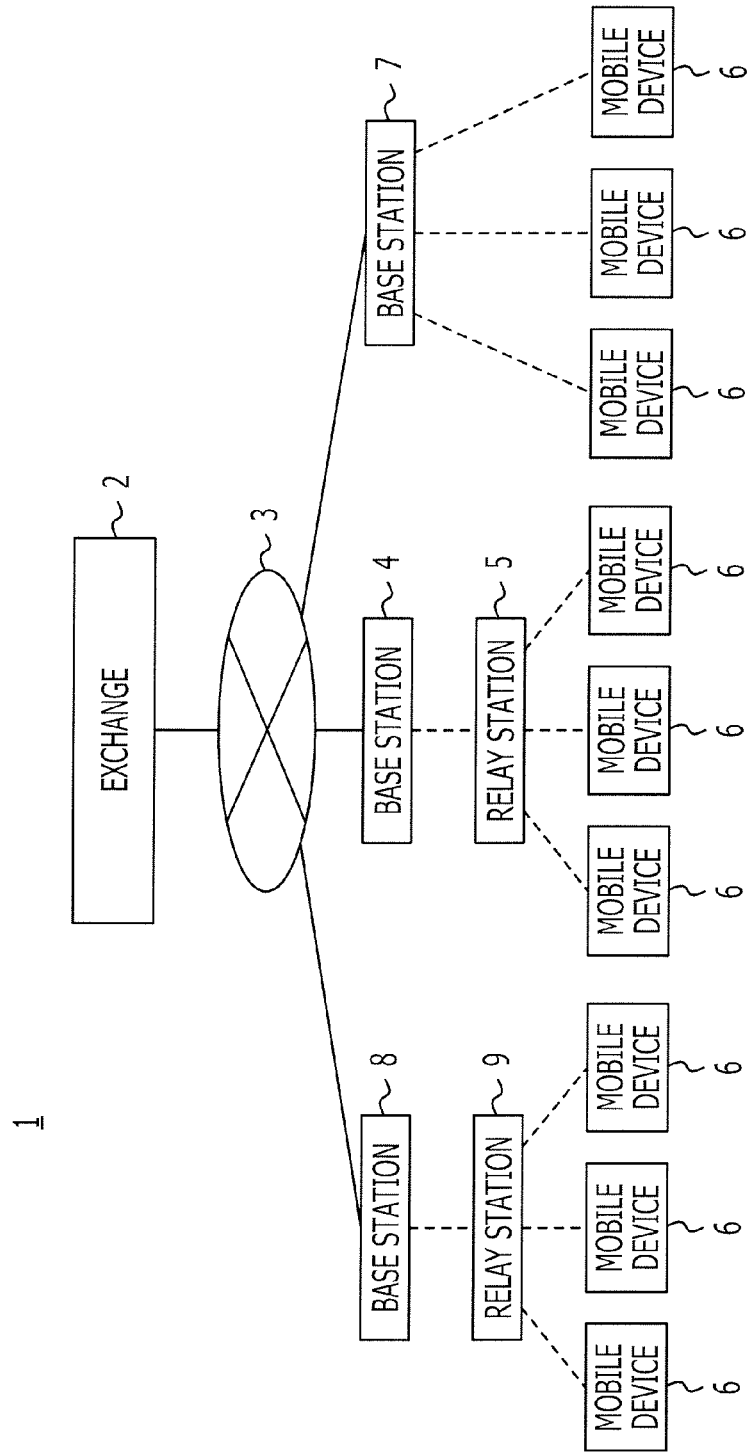
FIG. 1 is a block diagram of a wireless communication system 1 according to the present embodiment.

FIG. 1 is the block diagram of a wireless communication system 1 according to the present embodiment. The wireless communication system 1 executes data communication with an exchange 2 and a plurality of mobile devices 6. The wireless communication system 1 includes the exchange 2, a network 3, base stations 4, 7, and 8, relay stations 5 and 9, and the plural mobile devices 6.

In many-to-many electric communication, the exchange 2 switches a signal transmission path in response to the request of a sender. The exchange 2 is one of a plurality of exchanges configuring an electric communication network. The plural exchanges form the core portion of a mobile communications network, called a core network.

The network 3 is a network-coupling network coupling by wires the exchange 2 and the base stations 4, 7, and 8 with each other.

When the mobile devices or the relay stations perform communication, the base stations 4, 7, and 8 transmit and receive wireless signals to and from the mobile devices or the relay stations. The base stations 4, 7, and 8 are distributed at adequate intervals and installed. Usually the base stations 4, 7, and 8 simultaneously transmit and receive wireless signals to and from a plurality of relay stations or mobile devices. The base stations 4, 7, and 8 perform the setting of channels when starting communicating with the relay stations or the mobile devices, and switch channels at the time of handover. An area in which each base station is capable of communicating with a relay station or a mobile device is called a cell.

The relay station 5 transmits and receives wireless signals to and from the base station 4 and the mobile device 6. The relay station 9 transmits and receives wireless signals to and from the base station 8 and the mobile device 6. The relay stations 5 and 9 secondarily supplement areas cell areas due to the base stations 4 and 8 may not sufficiently cover. The relay stations 5 and 9 individually have two functions including a function as a mobile device communicating with the base stations 4 and 8 and a function as a base station communicating with the mobile devices 6. In the present embodiment, the relay stations 5 and 9 individually relay communication between the base stations 4 and 8 and the mobile devices 6. In the present embodiment, the relay stations 5 and 9 individually exist on a continuous basis, within cells the base stations 4 and 8 cover.

The mobile device 6 is a mobile terminal communicating with another mobile device through the exchange 2. The mobile device 6 is capable of moving from a current cell to another cell. When the mobile device 6 performing wireless communication with the relay station 5 has moved to a cell range configured by the relay station 9 or the base station 7, the relay station 5 executes handover processing as appropriate.

At the time of the occurrence of handover processing, retained data retained in the base station 4 and the relay station 5 is transferred to a base station or a relay station, which serves as a handover destination. Depending on which of the base station and the relay station configures a cell serving as the handover destination, an optimum procedure for the retained data becomes different. In response to the device configuration of the handover destination, the relay station 5 selects and executes an optimum transfer processing for the retained data.

Figure 2:
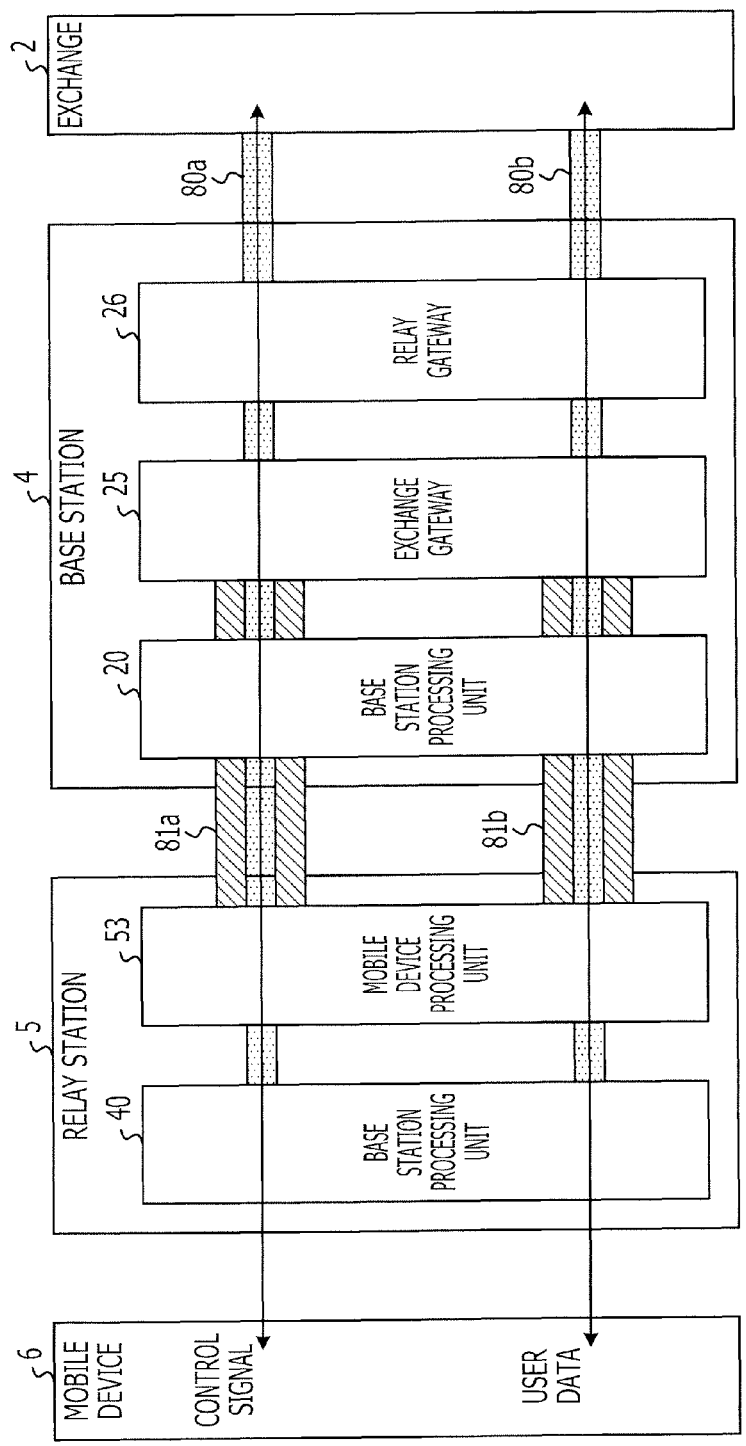
FIG. 2 is a block diagram illustrating a flow of data between individual nodes.

FIG. 2 is a block diagram illustrating the flow of data between individual nodes. The exchange 2 transmits and receives control signals and user data to and from the mobile devices 6 through the relay station 5 and the base station 4. The control signal is handled in a Control plane (C-plane) protocol hierarchy, and the user data is handled in a User plane (U-plane) protocol hierarchy. The base station 4 includes a base station processing unit 20, an exchange gateway 25, and a relay gateway 26. The relay station 5 includes a base station processing unit 40 and a mobile device processing unit 53.

In the base station 4, the base station processing unit 20 performs processing as a base station when the relay station 5 is regarded as a mobile device. The exchange gateway 25 and the relay gateway 26 perform conversion processing between a signal format geared toward an exchange and a signal format geared toward a relay station or a mobile device. In the relay station 5, the base station processing unit 40 performs processing as a base station for the mobile device 6. The mobile device processing unit 53 performs processing as a mobile device for the base station 4.

Protocols 80a and 80b indicate exchange protocols used for data communication between an exchange and a base station when there is no relay station. Protocols 81a and 81b indicate wireless communication protocols used for data communication between a base station and a mobile device when there is no relay station. The relay station 5 includes both of a function for serving as a base station and a function for serving as a mobile device so as to relay communication between the mobile device 6 and the base station 4.

With respect to the mobile device 6, the exchange gateway 25 is a gateway having a function used for making the base station 4 seem to stand proxy for the exchange 2 when the relay station 5 exists. The relay gateway 26 relays data communication between the base station 4 and the exchange 2.

Protocols between the relay station 5 and the base station 4 are link protocols having a format where the exchange protocols 80a and 80b are loaded on the wireless protocols 81a and 81b. The exchange gateway 25 and the relay gateway 26 convert the link protocols into the exchange protocols 80a and 80b. In addition, the exchange gateway 25 and the relay gateway 26 convert the exchange protocols 80a and 80b into the link protocols.

Owing to the above-mentioned configuration, by causing a protocol format when there is no relay station to be common to a protocol format when there is a relay station, it may be possible for the wireless communication system 1 to enhance the degree of freedom of the configuration of a wireless communication system.

Figure 3:
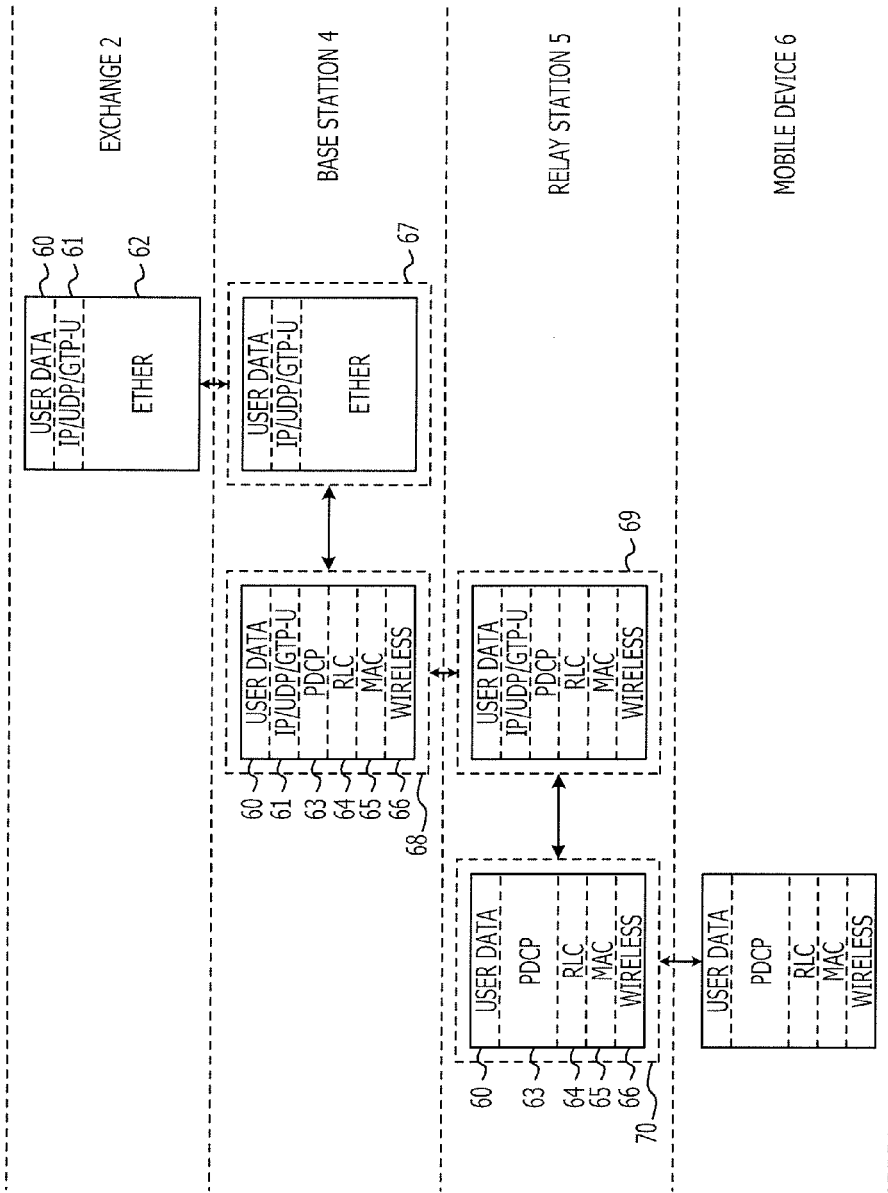
FIG. 3 is a block diagram illustrating a difference in protocol configuration between individual nodes.

FIG. 3 is a block diagram illustrating a difference in protocol configuration between individual nodes. A communication method in the present embodiment is Long Term Evolution (LTE). An LTE method includes a U-plane protocol hierarchy in which user data is handled and a C-plane protocol hierarchy in which a control signal is handled. FIG. 3 explains a protocol hierarchy in a U-plane. The description of a protocol hierarchy in a C-plane will be omitted.

The protocol of the exchange 2 includes UserData 60, IP/UDP/GTP-U 61, and Ether 62. The UserData 60 is user data transmitted and received between the mobile device 6 and the exchange 2. The IP/UDP/GTP-U 61 individually express exchange protocols. The Internet Protocol (IP) is an Internet communication protocol. The User Datagram Protocol (UDP) is a communication protocol not confirming that data has reached a data transmission partner. The GPRS Tunneling Protocol for User Plane (GTP-U) is a protocol used for transferring user data. The General Packet Radio Service (GPRS) is one of technologies for transmitting data in units of packets. The GTP-U is a tunneling protocol used for transferring retained data to another node. The Ether 62 indicates that a physical network performing protocol communication is Ethernet (registered trademark).

The base station 4 performs conversion processing between an exchange protocol 67 serving as a protocol used for communication with the exchange 2 and a link protocol 68 used for wireless communication with the relay station 5. Since the exchange protocol 67 in the base station 4 has the same configuration as the protocol in the exchange 2, the description thereof will be omitted.

The link protocol 68 in the base station 4 has a structure where a wireless communication protocol is loaded on an exchange protocol. The link protocol 68 includes the UserData 60, the IP/UDP/GTP-U 61, the UserData 60, a PDCP 63, an RLC 64, a MAC 65, and wireless 66. The PDCP (Packet Data Convergence Protocol) 63 is a wireless protocol performing the concealment of the UserData 60, header compression, and so forth. The PDCP 63 has a sequence number in communication with the relay station 5. The Radio Link Control (RLC) 64 is a protocol used for controlling the retransmission of data. The Medium Access Control (MAC) 65 is a protocol performing mapping between a logical channel and a transport channel. The wireless 66 indicates that a physical network performing protocol transmission uses wireless communication.

The relay station 5 performs conversion processing between a link protocol 69 with the base station 4 and a wireless communication protocol 70 with the mobile device 6. The link protocol 69 is uplink data to be transmitted to the base station 4. The wireless communication protocol 70 is downlink data to be transmitted to the mobile device 6. Since the link protocol 69 has the same configuration as the link protocol 68 in the base station 4, the description thereof will be omitted.

The wireless communication protocol 70 in the relay station 5 includes the UserData 60, the PDCP 63, the RLC 64, the MAC 65, and the wireless 66. The wireless communication protocol 70 has a configuration where the IP/UDP/GTP-U 61 serving as exchange protocols are removed from the link protocol 69 geared toward the base station 4. The sequence number of the wireless communication protocol 70 in the PDCP 63 has a value independent from a sequence number in the link protocol 69. By causing the sequence number to be independent in each communication section, it may be possible to perform data communication independent in each communication section.

Since the wireless communication protocol in the mobile device 6 has the same configuration as the wireless communication protocol 70 in the relay station 5, the description thereof will be omitted.

As described above, different protocol formats are individually used between nodes, and each piece of packet data is managed using an independent sequence number. Therefore, it may be possible to send back a response signal with a short response speed with respect to a request signal from each node.

Figure 4:
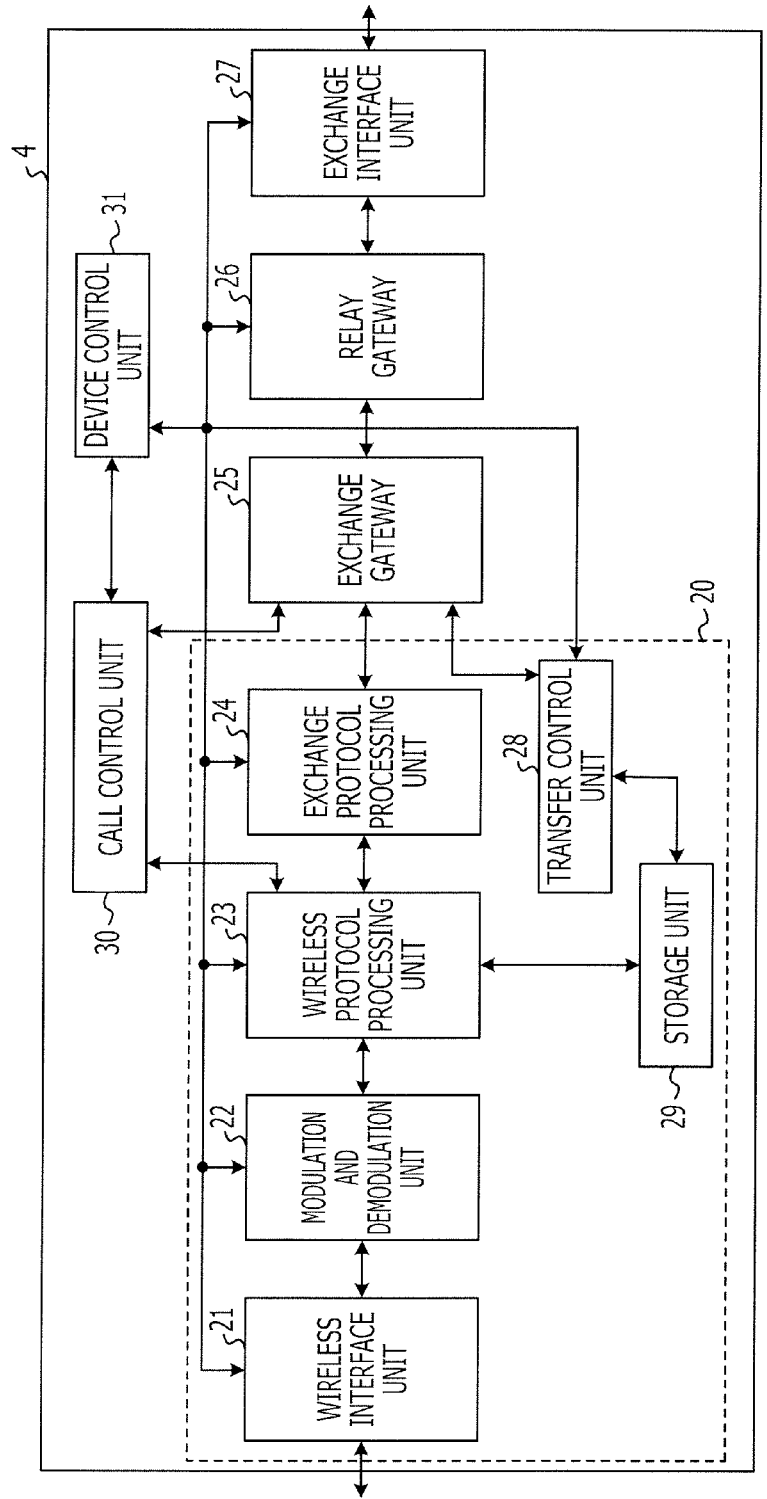
FIG. 4 is a detailed block diagram of a base station.

FIG. 4 is the detailed block diagram of a base station 4. Since the base station 7 also has the same configuration as the base station 4, the base station 4 will be only described, and the description of the base station 7 will be omitted.

The base station 4 includes the base station processing unit 20, the exchange gateway 25, the relay gateway 26, an exchange interface unit 27, a call control unit 30, and a device control unit 31. The base station processing unit 20 performs processing as a base station when the relay station 5 virtually operates as a mobile device. The base station processing unit 20 includes a wireless interface unit 21, a modulation and demodulation unit 22, a wireless protocol processing unit 23, an exchange protocol processing unit 24, a transfer control unit 28, and a storage unit 29.

The wireless interface unit 21 transmits and receives wireless signals to and from a relay station or a mobile device through an antenna. The modulation and demodulation unit 22 performs modulation and demodulation processing for communication data with the relay station or the mobile device. The wireless protocol processing unit 23 performs termination for the wireless communication protocol with the relay station or the mobile device. The exchange protocol processing unit 24 performs termination for the exchange protocol with the exchange 2. Examples of the termination processing for a protocol include the conversion of a protocol and the assignment of a sequence number.

The exchange gateway 25 and the relay gateway 26 perform conversion processing between a signal format geared toward an exchange and a signal format geared toward a relay station or a mobile device. The signal format geared toward an exchange is an exchange protocol format. The signal format geared toward a relay station or a mobile device is a format where the exchange protocol is loaded on the wireless communication protocol.

With respect to the mobile device, the exchange gateway 25 has a function used for making the base station seem to stand proxy for the exchange. Owing to this function, the mobile device performs communication with regarding the relay station as a proxy base station and the base station as a proxy exchange. Since the actual exchange exists in a rank higher than the base station, the relay gateway 26 performs relay processing between the base station 4 serving as a proxy exchange and the actual exchange 2.

The exchange interface unit 27 transmits and receives signals to and from the exchange 2 through a transmission path. In response to a call control signal, the call control unit 30 manages a call coupling state. The call control signal is a signal to be a trigger during a sequence such as setting and releasing of a path for data transfer, a handover request, or a resource releasing instruction. While transmitting the call control signal to another node, the call control unit 30 receives a call control signal from another node. In response to the type of a received handover request signal, the call control unit 30 executes optimum handover processing.

The device control unit 31 monitors and controls the inside of the base station 4. In response to an instruction from the call control unit 30, the device control unit 31 performs the setting and the releasing of a path used for data transfer, on the transfer control unit 28, the exchange gateway 25, the relay gateway 26, and the exchange interface unit 27.

In response to an instruction from the device control unit 31, the transfer control unit 28 executes data transfer. The storage unit 29 stores therein data transmitted from a path for data transfer. The storage unit 29 may also be a buffer such as, for example, First In First Out (FIFO).

When the base station 4 is a base station serving as a handover source, the storage unit 29 has retained data to be transferred to the base station serving as a handover destination, using a set path for data transfer. After the setting of a path used for data transfer has been completed in individual units in the device, the device control unit 31 instructs the transfer control unit 28 to transfer the retained data. The transfer control unit 28 transmits the retained data read from the storage unit 29, to the path for data transfer. After having transferred all the retained data, the transfer control unit 28 transmits an EndMarker. The transfer control unit 28 notifies the device control unit 31 of the transfer completion of the retained data. The device control unit 31 notifies the call control unit 30 of the transfer completion of the retained data.

When the base station 4 is a base station serving as a handover destination, the storage unit 29 stores therein retained data transmitted from a relay station serving as a handover source, using a path for data transfer. After the setting of a path used for data transfer has been completed in individual units in the device, the device control unit 31 instructs the transfer control unit 28 to store received retained data. The transfer control unit 28 writes, into the storage unit 29, the retained data received using the path for data transfer. When having received an EndMarker, the transfer control unit 28 notifies the device control unit 31 of reception completion. The device control unit 31 notifies the call control unit 30 of the reception completion of the retained data. When having received a notice from the device control unit 31 and a transfer completion notice from the base station serving as a handover destination, the call control unit 30 starts the communication of new data with the mobile device 6 and the base station 4.

Owing to the above-mentioned configuration, it may be possible for the base station 4 to function as a proxy for an exchange with respect to a mobile device, and function as a base station with respect to an actual exchange. In addition, a path used for transfer is established with a base station serving as a handover source, at the time of the occurrence of handover processing, and it may be possible to receive and store retained data retained in the base station serving as a handover source.

Figure 5:
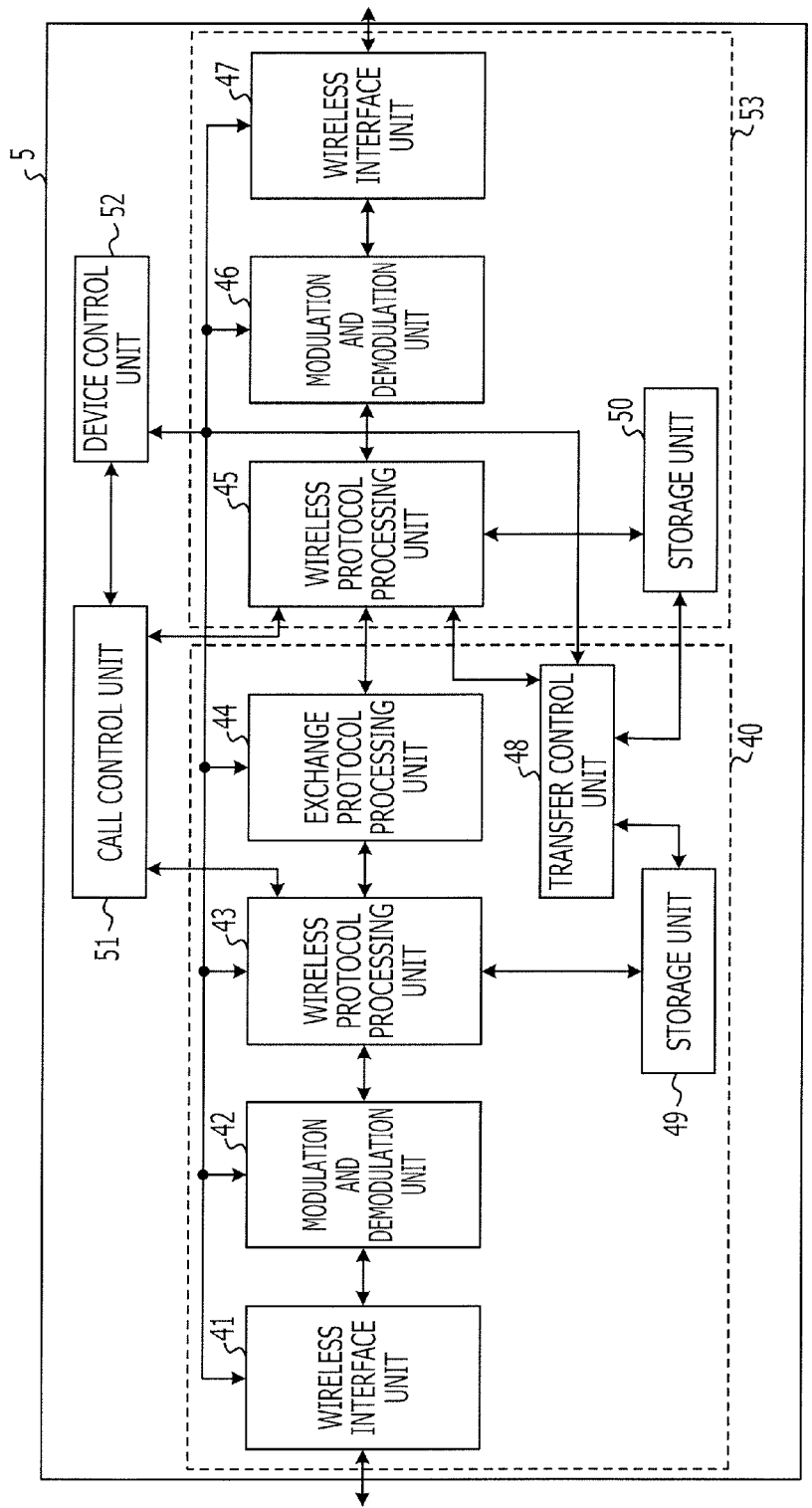
FIG. 5 is a detailed block diagram of a relay station.

FIG. 5 is the detailed block diagram of the relay station 5. The relay station 5 includes two functions including a function as a mobile device communicating with the base station 4 and a function as a base station communicating with the mobile device 6. Since the relay station 9 also has the same configuration as the relay station 5, the relay station 5 will be only described, and the description of the relay station 9 will be omitted.

The relay station 5 includes the base station processing unit 40, the mobile device processing unit 53, a call control unit 51, and a device control unit 52. The base station processing unit 40 functions as a base station for the mobile device 6. The mobile device processing unit 53 functions as a mobile device for the base station 4. The base station processing unit 40 includes a wireless interface unit 41, a modulation and demodulation unit 42, a wireless protocol processing unit 43, an exchange protocol processing unit 44, a transfer control unit 48, and a storage unit 49. The mobile device processing unit 53 includes a wireless protocol processing unit 45, a modulation and demodulation unit 46, a wireless interface unit 47, and a storage unit 50.

The wireless interface unit 41 transmits and receives wireless signals to and from a mobile device. The modulation and demodulation unit 42 demodulates data received from the mobile device 6, and modulates data to be transmitted to the mobile device 6. The wireless protocol processing unit 43 performs termination for a received wireless communication protocol. The exchange protocol processing unit 44 performs termination for a received exchange protocol.

In response to a call control signal, the call control unit 51 manages a call coupling state. The call control signal is a signal to be a trigger during a sequence such as setting and releasing of a path for data transfer, a handover response, or a resource releasing instruction. The call control signal is transmitted from another node. When having received the call control signal from another node, the call control unit 51 instructs the device control unit 52 to set and release a path used for data transfer. In addition, the call control unit 51 transmits a call control signal to another node. In response to the type of a received handover request signal, the call control unit 51 executes optimum handover processing.

The device control unit 52 monitors and controls the inside of the relay station 5. In response to an instruction from the call control unit 51, the device control unit 52 performs the setting and the releasing of a path used for data transfer, on the exchange protocol processing unit 44, the wireless protocol processing units 43 and 45, the modulation and demodulation units 42 and 46, the wireless interface units 41 and 47, and the transfer control unit 48. In response to an instruction from the device control unit 52, the transfer control unit 48 executes data transfer processing.

The storage unit 49 stores therein data to be transmitted to the mobile device 6. The storage unit 50 stores therein data to be transmitted to the base station 4. The storage units 49 and 50 are, for example, First In First Out (FIFO).

When the relay station 5 is a relay station serving as a handover source, the storage units 49 and 50 have retained data to be transferred to a relay station serving as a handover destination, at the time of the occurrence of handover processing. After the setting of a path used for data transfer has been completed in individual units in the device, the device control unit 52 instructs the transfer control unit 48 to transfer the retained data. The transfer control unit 48 transmits the retained data read from the storage units 49 and 50, to the path for data transfer. After having transferred all the retained data, the transfer control unit 48 transmits an EndMarker. The transfer control unit 48 notifies the device control unit 52 of the transfer completion of the retained data. The device control unit 52 notifies the call control unit 51 of the transfer completion of the retained data.

When the relay station 5 is a relay station serving as a handover destination, the storage units 49 and 50 store therein retained data transmitted from a relay station serving as a handover source, using a path for data transfer. After the setting of a path used for data transfer has been completed in individual units in the device, the device control unit 52 instructs the transfer control unit 48 to store received retained data. The transfer control unit 48 writes, into the storage units 49 and 50, the retained data received using the path for data transfer. When having received an EndMarker, the transfer control unit 48 notifies the device control unit 52 of reception completion. The device control unit 52 notifies the call control unit 51 of the reception completion of the retained data. When having received a notice from the device control unit 52 and a transfer completion notice from the base station serving as a handover destination, the call control unit 51 instructs the device control unit 52 to release the path used for data transfer. In response to the instruction from the call control unit 51, the device control unit 52 causes the exchange protocol processing unit 44, the wireless protocol processing units 43 and 45, the modulation and demodulation units 42 and 46, the wireless interface units 41 and 47, and the transfer control unit 48 to release the path used for data transfer. After the path used for data transfer has been released, the relay station 5 starts the communication of new data with the mobile device 6 and the base station 4.

Owing to the above-mentioned configuration, it may be possible for the relay station 5 to function as a base station with respect to an actual mobile device, and function as a mobile device with respect to an actual base station. In addition, a path used for transfer is established with a relay station serving as a handover destination, at the time of the occurrence of handover processing, and it may be possible to receive and store retained data retained in a relay station serving as a handover source.

Figure 6:
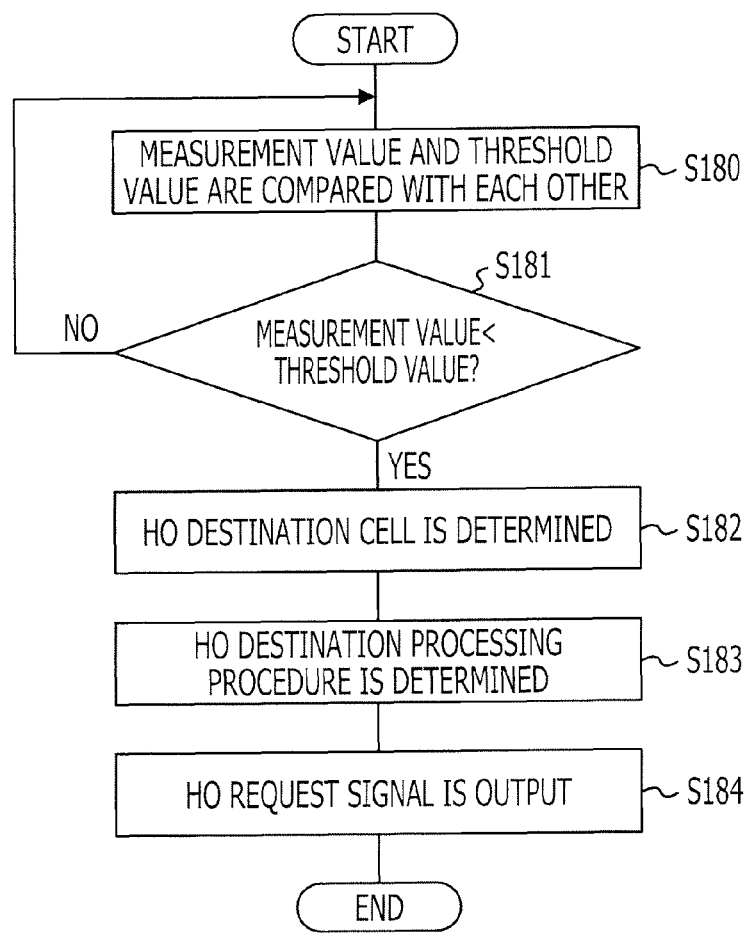
FIG. 6 is a handover processing execution determination flowchart diagram of a relay station serving as a handover source.

FIG. 6 is the handover processing execution determination flowchart diagram of a relay station serving as a handover source. In the relay station 5 serving as a handover source, the call control unit 51 starts executing handover processing, on the basis of the measurement result of the intensity of a reception radio wave from the mobile device 6.

The call control unit 51 has the cell number of a neighboring cell and the configuration information of a base station or relay station covering a cell corresponding to each cell number. By referring to the configuration information on the basis of a cell number, the call control unit 51 may judge whether a cell corresponding to the cell number is due to a base station or a relay station. The call control unit 51 receives a measurement result periodically transmitted from the mobile device 6. The measurement result includes information relating to the intensity of a reception radio wave from a base station or relay station covering individual adjacent cell numbers.

When having received the measurement result of the radio wave intensity from the mobile device 6, the call control unit 51 compares a measurement value and a preliminarily set threshold value with each other (S180). The threshold value is a value used for determining whether or not to hand over to another cell area. The threshold value may also be stored in the call control unit 51.

When the measurement value is greater than or equal to the threshold value (S181: NO), the call control unit 51 continues communication with the mobile device with no change, without performing handover processing. When the measurement value is smaller than the threshold value (S181: YES), the call control unit 51 determines a cell to serve as a handover destination, on the basis of the measurement value of the intensity of a reception radio wave from another cell, received from the mobile device 6 (S182).

On the basis of the cell number of the determined cell, the call control unit 51 refers to the configuration information, and judges whether a base station or a relay station configures the cell to serve as a handover destination. On the basis of the configuration of the judged handover destination, the call control unit 51 determines the procedure of handover processing (S183).

In accordance with the determined procedure of handover processing, the call control unit 51 transmits a request signal for handover, to a base station and a relay station, which serve as handover destinations (S184).

Figure 7:
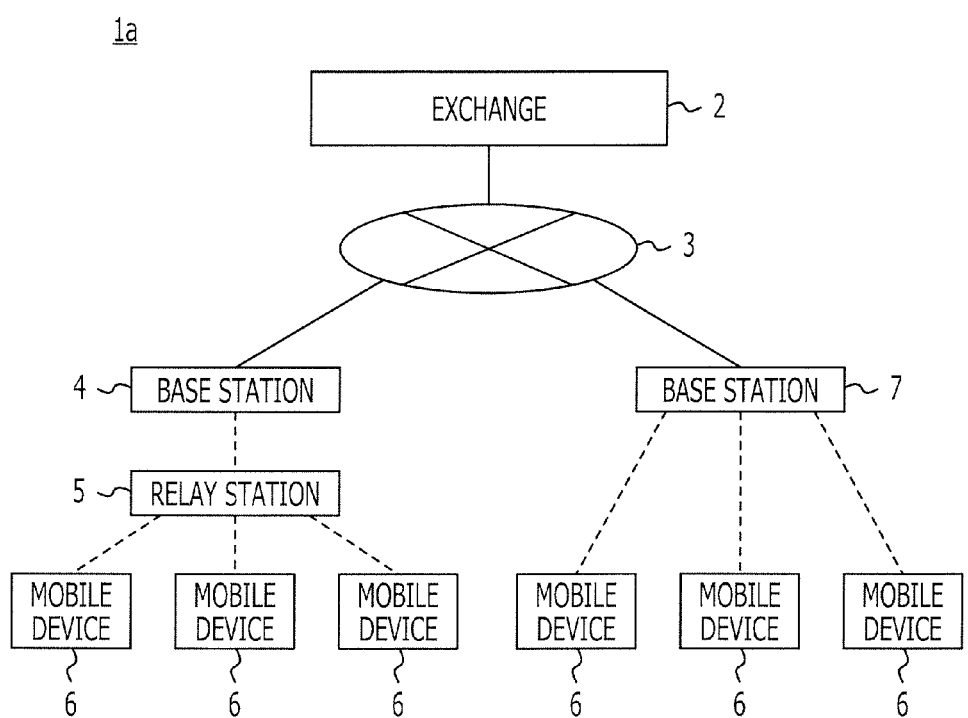
FIG. 7 is a block diagram of a wireless communication system 1a serving as a portion of the wireless communication system 1.

FIG. 7 is the block diagram of a wireless communication system 1*a* serving as a portion of the wireless communication system 1. The wireless communication system 1*a* includes the exchange 2, the network 3, the base stations 4 and 7, the relay station 5, and the plural mobile devices 6. In FIG. 7, the same number is assigned to the same member as in FIG. 1, and the description thereof will be omitted.

In the present embodiment, handover processing will be described that is performed when the mobile device 6 belonging to a cell range formed by the relay station 5 has moved to a cell range formed by the base station 7.

Figure 8A:
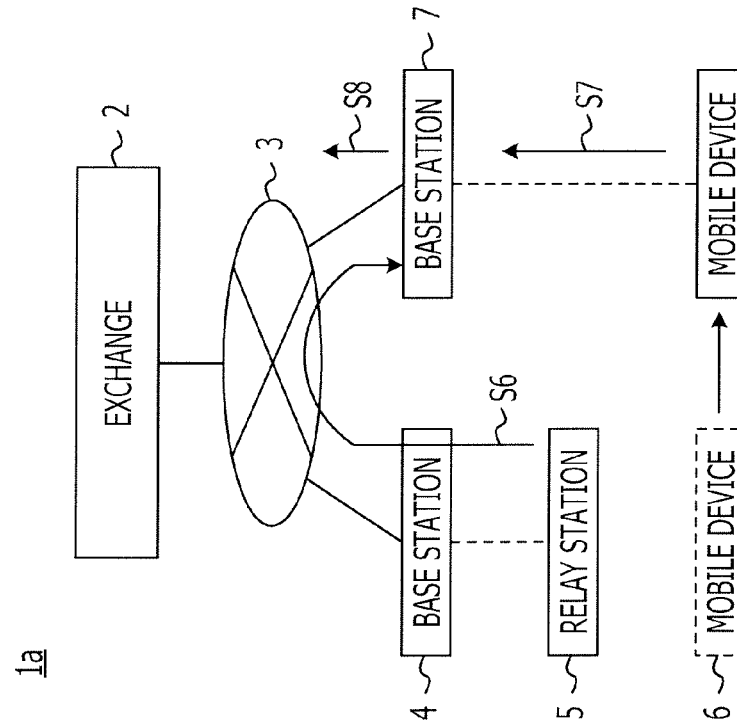
Figure 8B:
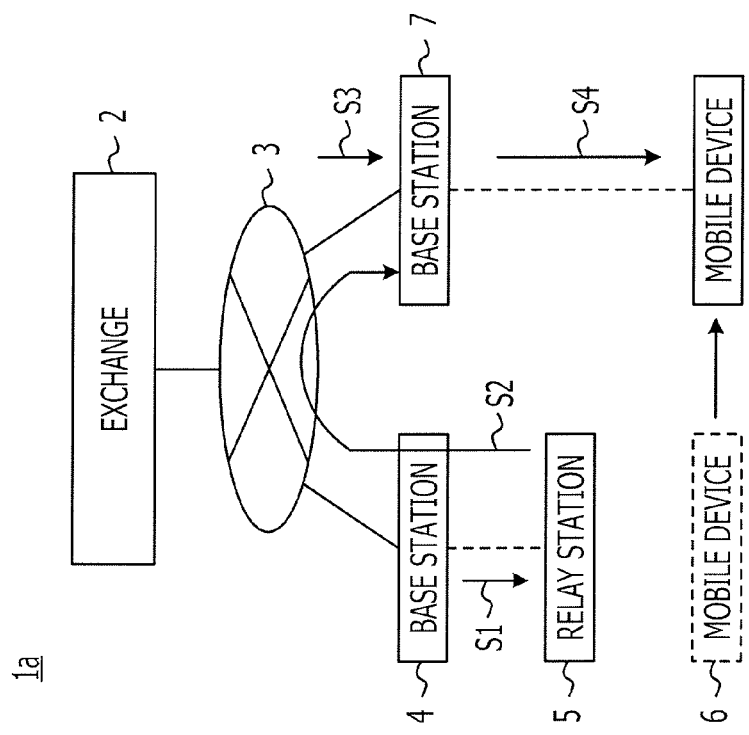

FIGS. 8A and 8B are the schematic diagrams of data processing operations in individual nodes when handover processing has occurred in the wireless communication system 1*a*. FIG. 8A is a schematic diagram when handover processing has occurred in the relay station 5 during the reception of data from the exchange 2. FIG. 8B is a schematic diagram when handover processing has occurred in the relay station 5 during the transmission of data to the exchange 2. In FIGS. 8A and 8B, the same number is assigned to the same member as in FIG. 1, and the description thereof will be omitted.

In FIG. 8A, during transmitting downlink data from the exchange 2 to the mobile device 6, the relay station 5 performs processing for handing over from the relay station 5 to the base station 7. In a case where handover has occurred when the mobile device 6 is receiving data, data is retained in the base station 4 and the relay station 5. The retention of data occurs in a wireless section. The protocol of data retained in the base station 4 is different from the protocol of data retained in the relay station 5. So as to avoid protocol conversion processing at the time of the transfer of the retained data, the retained data in the base station 4 is transferred to the base station 7 along with the retained data in the relay station 5 after having been transferred to the relay station 5.

Using a sequence number assigned to data, the relay station 5 and the base station 7 notify each other of where data transmitted and received before the handover processing ends and where new data begins after the handover processing. The sequence number is independently managed between nodes. Therefore, even if the sequence numbers of pieces of data are compared between different nodes, in some cases the anteroposterior relationship of data is inaccurate. Therefore, at the time of the occurrence of handover processing, it is desirable that timing adjustment is performed on retained data transfer between base stations, retained data transfer between relay stations, and the reception of data newly received from the exchange 2 after the handover processing.

Using FIG. 8A, the outline of handover processing at the time of transmitting downlink data will be described. When the handover processing has occurred, the base station 4 starts transferring retained data to the relay station 5 (S1). After the transfer processing for the retained data has finished, the base station 4 notifies the relay station 5 of transfer completion. The relay station 5 having received a notice from the base station 4 starts transferring retained data to the base station 7 (S2). After the transfer processing for the retained data has finished, the relay station 5 notifies the base station 7 of transfer completion.

The base station 7 having received the transfer completion notice notifies the exchange 2 and the mobile device 6 of data transfer completion. The exchange 2 having received the data transfer completion notice from the base station 7 resumes communication with the mobile device 6. The exchange 2 transmits downlink data to the base station 7 (S3). The downlink data transmitted to the base station 7 pushes out downlink retained data temporarily stored in a storage unit in the base station 7. The uplink retained data pushed out from the base station 7 is transmitted to the mobile device 6 (S4). As a result, the mobile device 6 receives data including the downlink retained data in the base station 7 and the downlink data transmitted from the exchange 2, in that order.

As described above, by controlling transfer processing for data retained in the base station 4 and the relay station 5, it may be possible to optimize data transmission to the mobile device 6 after the handover processing.

In FIG. 8B, during the transmission of uplink data from the mobile device 6 to the exchange 2, the relay station 5 performs processing for handing over from the relay station 5 to the base station 7. When handover has occurred during the transmission of uplink data from the mobile device 6, uplink data is retained in the relay station 5.

Since, in the uplink retained data, a sequence number has been converted for the base station 4, if the uplink retained data is transferred to the base station 7 without change, it may be likely that the order of a number is replaced by the sequence number of data received from the mobile device 6 after transfer. So as to avoid the replacement of the order, the relay station 5 converts the protocol and the sequence number of the uplink retained data, geared toward the base station 4, into a protocol and a sequence number when having received from the mobile device 6 (S5).

After the conversion of the protocol and the sequence number, the relay station 5 starts transferring the uplink retained data to the base station 7 (S6). In addition, it is assumed that since the base station 4 is coupled to the exchange 2 by a wire, the retention of uplink data due to the handover processing does not occur in the base station 4.

After the completion of the transfer processing for the retained data, the relay station 5 notifies the base station 7 of transfer completion. The base station 7 having received the transfer completion notice from the relay station 5 notifies the exchange 2 and the mobile device 6 of data transfer completion.

The mobile device 6 having received the data transfer completion notice from the base station 7 resumes communication with the exchange 2. The mobile device 6 transmits uplink data to the base station 7 (S7). When having received data, the base station 7 transmits, to the exchange 2, data in order starting from old uplink retained data temporarily stored in the storage unit in the base station 7 (S8). As a result, the exchange 2 receives data including the uplink retained data in the base station 7 and the uplink data transmitted from the mobile device 6, in that order.

As described above, by controlling transfer processing for data retained in the base station 4 and the relay station 5, it may be possible to optimize data transmission to the exchange 2 after the handover processing.

Figure 9A:
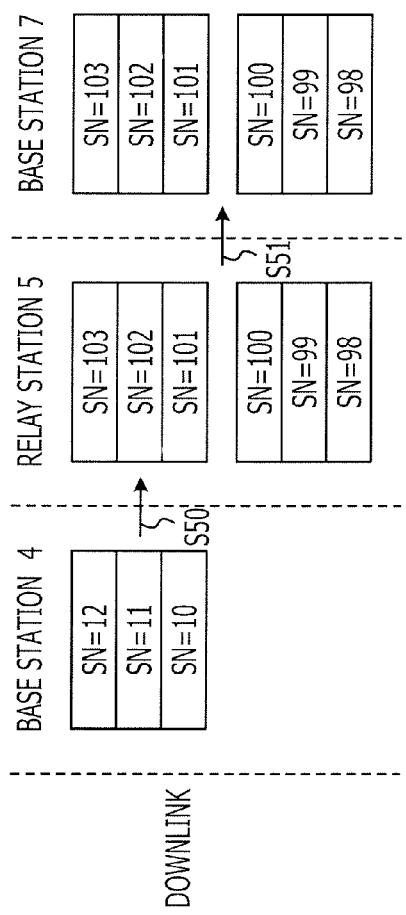
FIG. 9A illustrates a change in the sequence number of downlink retained data.
Figure 9B:
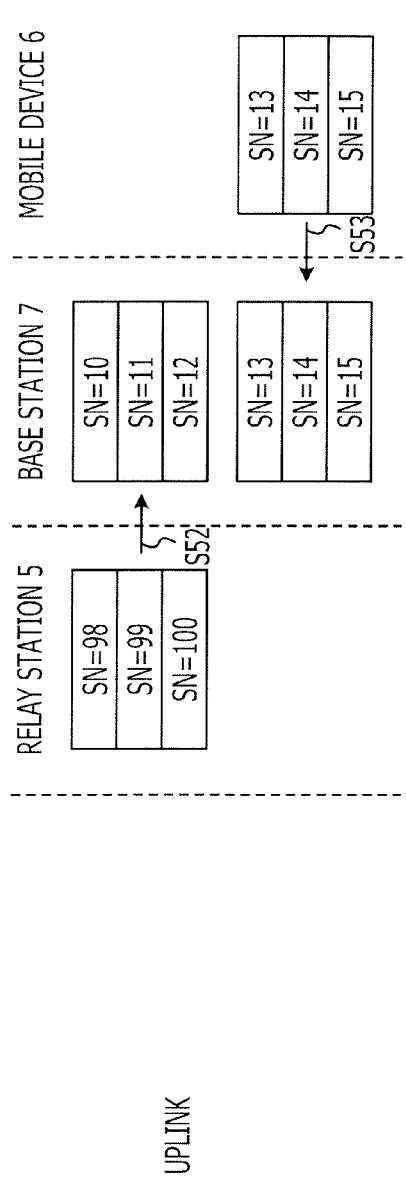
FIG. 9B illustrates the sequence number of uplink retained data.

FIGS. 9A and 8B illustrate changes in the sequence number of retained data in data transfer. FIG. 9A illustrates a change in the sequence number of downlink retained data. FIG. 9B illustrates the sequence number of uplink retained data.

In FIG. 9A, pieces of downlink retained data whose sequence numbers SN=10, 11, and 12 exist in the base station 4. Pieces of downlink retained data whose sequence numbers SN=98, 99, and 100 exist in the relay station 5. When the pieces of downlink retained data in the base station 4 have been transmitted to the relay station 5, sequence numbers are reassigned thereto (S50). New sequence numbers satisfy SN=101, 102, and 103 so as to follow data retained in the relay station 5.

The relay station 5 transfers the pieces of data of SN=98 to 103 to the base station 7 (S51). By transmitting the pieces of downlink retained data in the base station 4 to the relay station 5 once and transferring the pieces of downlink retained data to the base station 7 after having arranged the sequence numbers thereof, it may be possible to transfer to the base station 7 with maintaining an anteroposterior relationship between pieces of data separately retained in the base station 4 and the relay station 5.

In FIG. 9B, the sequence numbers of pieces of uplink retained data retained in the relay station 5 satisfy SN=98, 99, and 100. So as to be transmitted to the base station 4, the sequence numbers have been converted, in the relay station 5, into numbers different from when having been received from the mobile device 6.

On the other hand, the sequence numbers of pieces of data not having been transmitted from the mobile device 6 satisfy SN=13, 14, and 15. Accordingly, if the data of the relay station 5 is transferred to the base station 7 without change, the sequence numbers of pieces of uplink retained data in the relay station 5 become larger than the sequence numbers of pieces of data not having been transmitted from the mobile device 6. Therefore, order reversal occurs between the pieces of uplink retained data in the relay station 5 and the pieces of data not having been transmitted from the mobile device 6.

In order to avoid reversal of data, on the basis of the sequence numbers of the pieces of data not having been transmitted from the mobile device 6, the relay station 5 reassigns sequence numbers so that the sequence numbers satisfy SN=10, 11, and 12, before transferring the pieces of uplink retained data to the base station 7. The relay station 5 transfers, to the base station 7, the pieces of uplink retained data to which the sequence numbers have been reassigned (S52).

After having transferred the pieces of uplink retained data to the base station 7, the mobile device 6 starts transmitting data to the base station 7 (S53). Owing to this, it may be possible for the mobile device 6 to resume transmitting data to the exchange 2 with maintaining data order before the handover.

Figure 10:
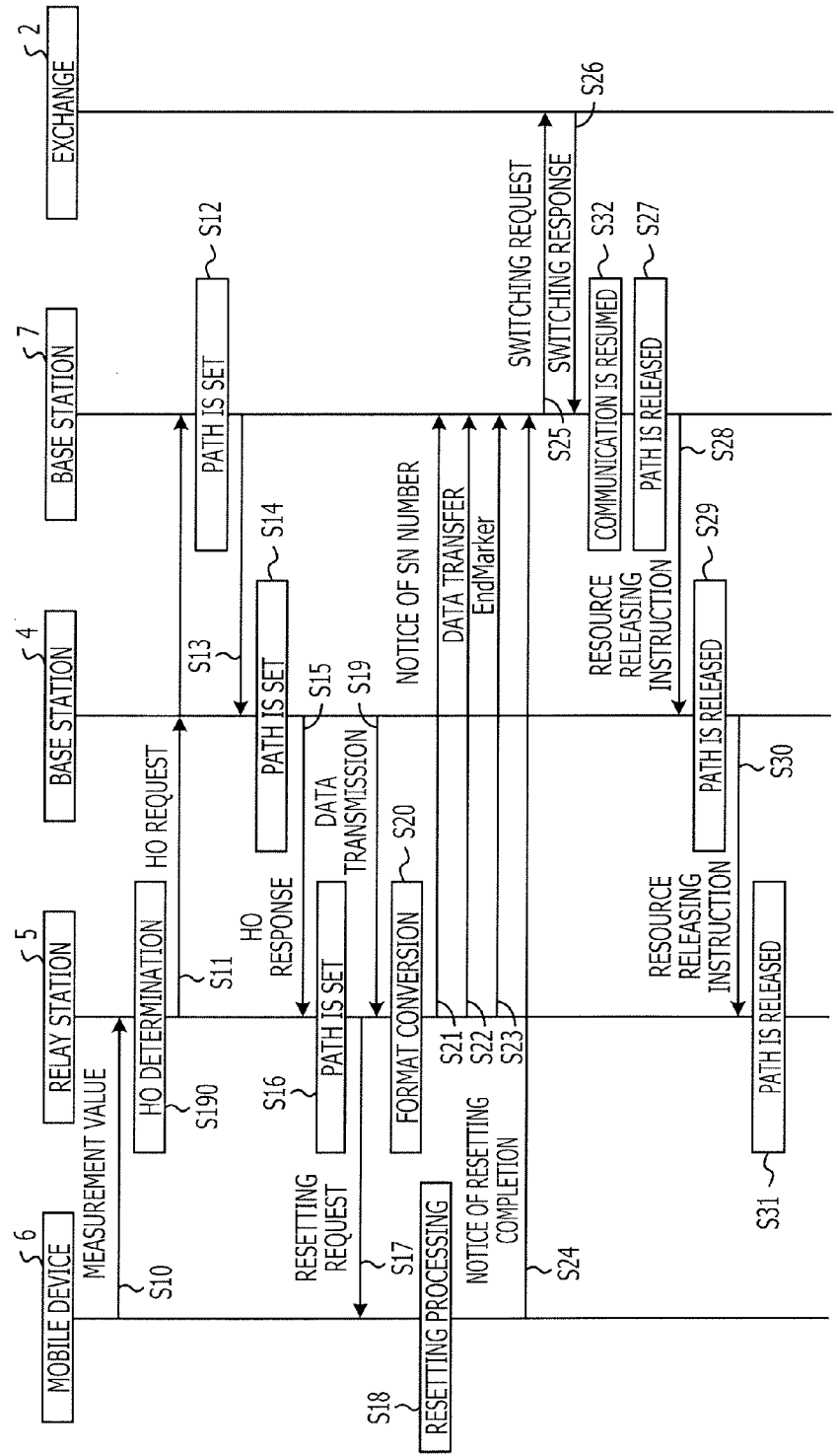
FIG. 10 is a sequence diagram of the wireless communication system 1a when a mobile device is handed over from a relay station to a base station.

FIG. 10 is the sequence diagram of the wireless communication system 1a when the mobile device 6 is handed over from the relay station 5 to the base station 7.

The mobile device 6 periodically transmits the measurement value of received signal power to the relay station 5 (S10). The relay station 5 executes determination processing for determining whether or not handover processing is to be performed (S190). When, as the result of the determination, having determined that the handover is desired, the relay station 5 outputs a handover (HO) request signal used for starting the handover processing, in accordance with the node configuration of a handover destination (S11). The base station 4 having received the handover request signal from the relay station 5 starts the handover processing, and transmits a handover request signal to the base station 7.

When having received the handover request signal, the base station 7 sets a path for data transfer and a channel, used for transferring, to the base station 7, retained data retained in the relay station 5 (S12). When the setting of the path for data transfer and the channel has been completed, the base station 7 transmits a handover response signal to the base station 4 (S13).

When having received the handover response signal, the base station 4 sets a path for data transfer and a channel, used for transferring retained data (S14). When the setting of the path for data transfer and the channel has been completed, the base station 4 transmits a handover response signal to the relay station 5 (S15).

When having received the handover response signal, the relay station 5 sets a path for data transfer and a channel, used for transferring retained data (S16). When the setting of the path for data transfer and the channel has been completed, the relay station 5 transmits, to the mobile device 6, a wireless channel resetting request signal used for switching the coupling destination of the mobile device 6 to the base station 7 (S17).

After having transmitted the handover response signal, the base station 4 transmits downlink retained data to the relay station 5 (S19). In accordance with the downlink retained data in the relay station 5, the relay station 5 converts the format and the sequence number of the downlink retained data received from the base station 4. In addition, the relay station 5 converts the sequence number of the uplink retained data on the basis of the sequence number of the data of the mobile device 6, the data of the mobile device 6 not having been transmitted (S20).

After having transmitted the wireless channel resetting request signal, the relay station 5 notifies the base station 7 of the sequence number of the final packet data of the retained data retained in the relay station 5 (S21). The base station 7 having received the sequence number starts transfer monitoring processing for the retained data received from the relay station 5.

After having notified the base station 7 of the sequence number, the relay station 5 starts transferring the retained data in the relay station 5 to the base station 7 (S22). After having transferred all the retained data, the relay station 5 transmits, to the base station 7, an EndMarker indicating the transfer completion of the retained data (S23). By receiving the EndMarker, the base station 7 detects the transfer completion of the retained data transferred from the relay station 5.

When having received the resetting request signal for a wireless channel from the relay station 5 serving as a handover source, the mobile device 6 executes resetting processing for communicating with the base station 7 serving as a handover destination (S18). When the resetting processing has been completed, the mobile device 6 transmits, to the base station 7, a resetting completion notice signal indicating that the resetting processing has been completed (S24).

When having received a wireless channel resetting request signal from the mobile device 6, the base station 7 transmits, to the exchange 2, a switching request signal used for switching a data transmission path, which leads from the mobile device 6 to the exchange 2, from the path for data transfer to a usual data transmission path (S25). The exchange 2 transmits, to the base station 7, a switching response signal indicating that the data transmission path has been switched from the path for data transfer to the usual data transmission path (S26).

The base station 7 having received a resource releasing instruction signal from the mobile device 6 resumes communication with the exchange 2 and the mobile device 6 (S32).

When having received uplink data from the mobile device 6, the base station 7 transmits stored uplink retained data to the exchange 2 first, and after that, transmits, to the exchange 2, uplink data received from the mobile device 6.

In addition, the base station 7 releases the path for data transfer and the channel (S27). After the path for data transfer and the channel have been released, the base station 7 transmits, to the base station 4, a resource releasing instruction signal instructing to release the path for data transfer and the channel (S28).

The base station 4 having received the resource releasing instruction signal releases the path for data transfer and the channel (S29). After having released the path for data transfer and the channel, the base station 4 transmits, to the relay station 5, a resource releasing instruction signal instructing to release the path for data transfer and the channel (S30). When having received the resource releasing instruction signal, the relay station 5 releases the path for data transfer and the channel (S31).

As described above, after transferring data retained in the relay station 5 and the base station 4, which serve as handover sources, to the base station 7 serving as a handover destination has been completed, the wireless communication system 1a resumes communication with the exchange 2 and the mobile device 6. Owing to this, it may be possible for the wireless communication system 1a to switch a base station and a relay station, which serve as the communication destinations of a mobile device, without generating the reordering of data.

In addition, after each node has performed release processing for a path for data transfer and a channel, a resource releasing instruction signal is transmitted to another node. Therefore, it may be possible to release a path and a channel, disused after transfer processing for retained data.

Figure 11:
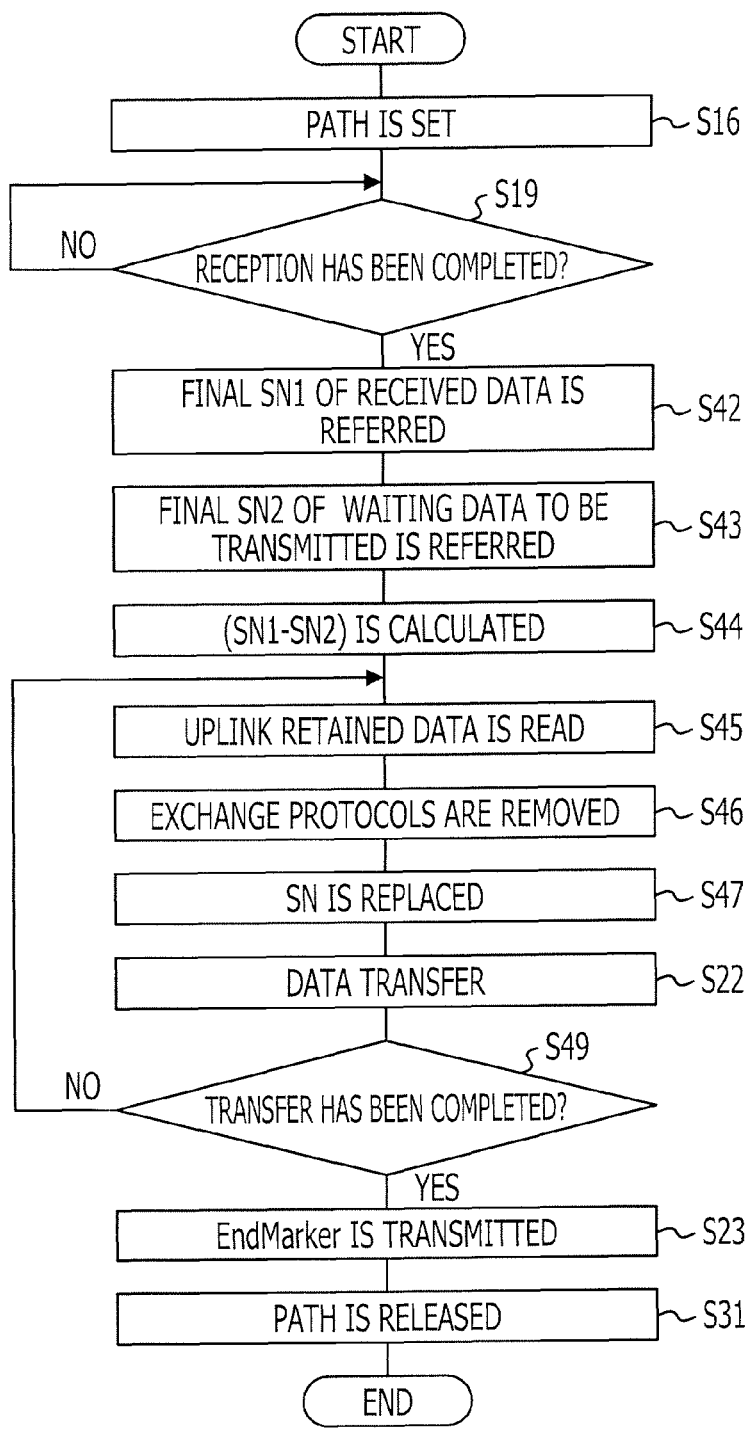
FIG. 11 is a processing flowchart diagram of a relay station serving as a handover source, in the sequence diagram in FIG. 10.

FIG. 11 is the processing flowchart diagram of the relay station 5 serving as a handover source, in the sequence diagram in FIG. 10. In the flowchart in FIG. 11, the same symbol is assigned to the same processing as in the sequence diagram. Using the flowchart in FIG. 11, processing in the relay station 5 will be described in more detail.

After the setting of a path used for retained data transfer has been completed (S16), the relay station 5 starts storing therein retained data transmitted from the base station 4 (S19). When the reception of the retained data has been completed (S19: YES), the relay station 5 refers to the final sequence number SN1 of data having already been received from the mobile device 6 before handover processing (S42). The final sequence number SN1 of data having already been received from the mobile device 6 has been recorded in an RLC protocol serving as a retransmission protocol, in the form of a state variable.

The relay station 5 refers to the final sequence number SN2 of data retained in the storage unit 50 (S43). The final sequence number SN2 of the retained data is a state variable in the RLC protocol. The relay station 5 calculates a difference between the SN1 and the SN2 (S44).

The relay station 5 reads uplink retained data from the storage unit 50 (S45). The relay station 5 removes IP/UDP/GTP-U serving as exchange protocols, from the read uplink retained data (S46). On the basis of the difference between the SN1 and the SN2, calculated earlier, the relay station 5 replaces a sequence number with respect to residual data after the removal of the exchange protocols (S47). Owing to the above-mentioned processing, the uplink retained data in the relay station 5 turns out to have a data format at the time of being received from the mobile device 6.

The relay station 5 transfers the retained data to the base station 7 (S22). When the transfer of the retained data has been completed (S49: YES), the relay station 5 transmits an EndMarker (S23). After the transfer of the retained data has been completed, the relay station 5 releases the path for data transfer, which has become disused (S31).

As described above, it may be possible for the relay station 5 to convert the protocols and the sequence numbers of pieces of data retained in both of the base station 4 and the relay station 5, which serves as handover sources, and transfer the pieces of data to the base station 7 serving as a handover destination.

Figure 12:
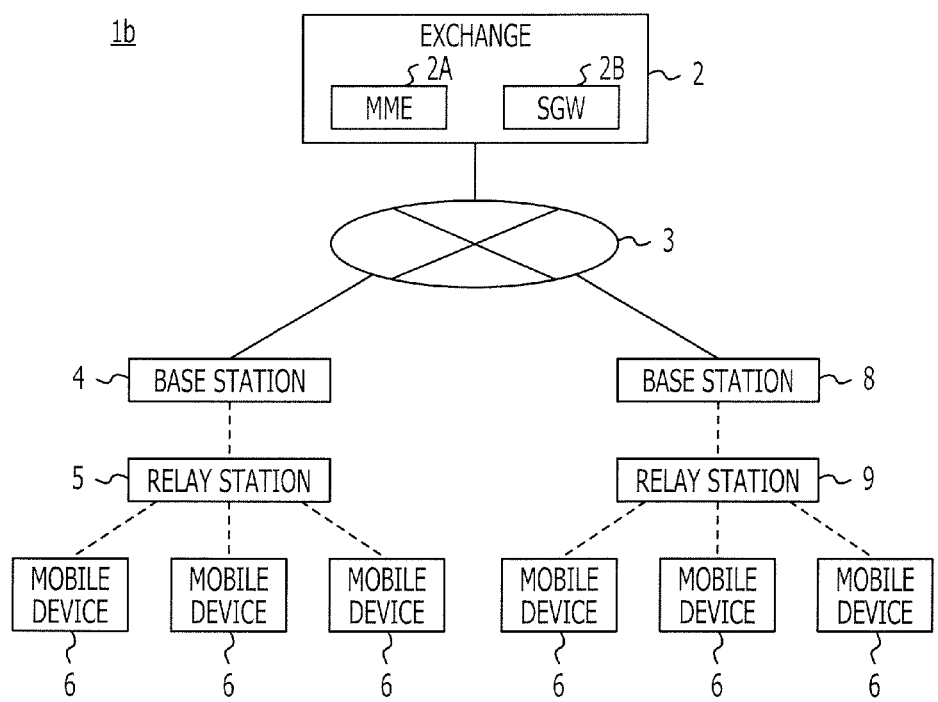
FIG. 12 is a block diagram of a wireless communication system 1b serving as a portion of the wireless communication system 1.

FIG. 12 is the block diagram of a wireless communication system 1b serving as a portion of the wireless communication system 1. The wireless communication system 1b includes the exchange 2, the network 3, the base stations 4 and 8, the relay stations 5 and 9, and the plural mobile devices 6. In FIG. 12, the same number is assigned to the same member as in FIG. 1, and the description thereof will be omitted.

In the present embodiment, handover processing will be described that is performed when the mobile device 6 belonging to a cell range formed by the relay station 5 has moved to a cell range formed by the relay station 9.

Figure 13A:
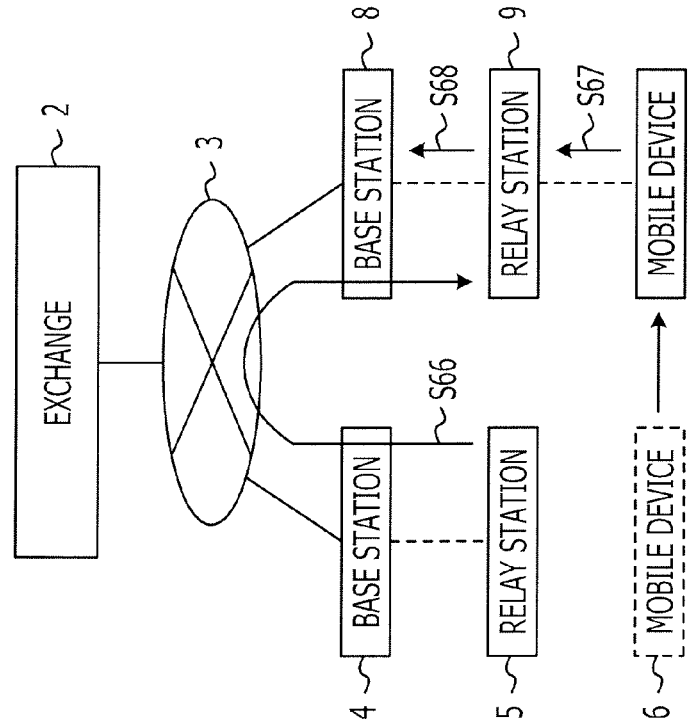
FIG. 13A is a schematic diagram when handover processing has occurred during transmission of data from an exchange to a mobile device.
Figure 13B:
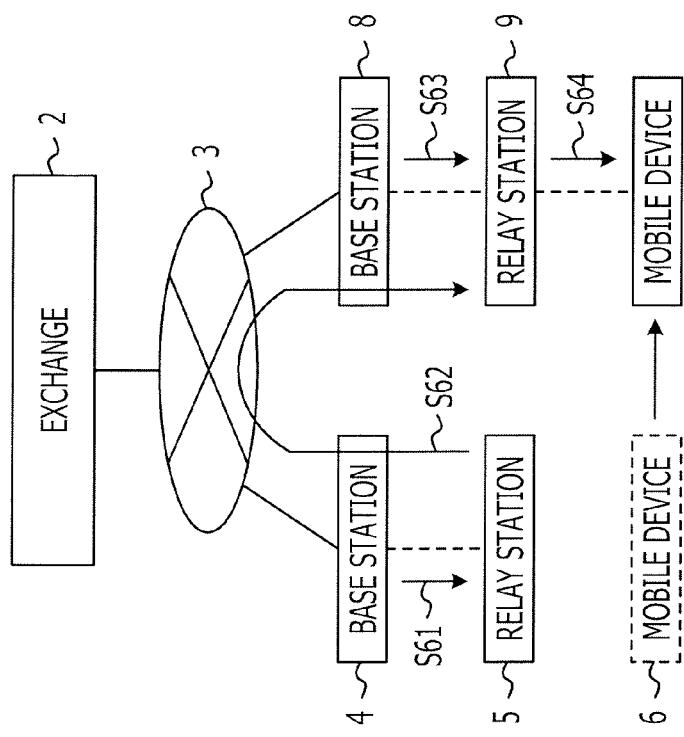
FIG. 13B is a schematic diagram when handover processing has occurred during transmission of data from a mobile device to an exchange.

FIGS. 13A and 13B are the schematic diagrams of data processing operations in individual nodes when handover processing has occurred in the wireless communication system 1b in FIG. 12. FIG. 13A is a schematic diagram when handover processing has occurred during the transmission of data from the exchange 2 to the mobile device 6. FIG. 13B is a schematic diagram when handover processing has occurred during the transmission of data from the mobile device 6 to the exchange 2. In FIGS. 13A and 13B, the same number is assigned to the same member as in FIG. 1, and the description thereof will be omitted.

In FIG. 13A, during transmitting downlink data from the exchange 2 to the mobile device 6, the relay station 5 performs processing for handing over from the relay station 5 to the relay station 9. When handover has occurred during the transmission of downlink data, data is retained in the base station 4 and the relay station 5. The retention of data occurs in a wireless section. The protocol of data retained in the base station 4 is different from the protocol of data retained in the relay station 5. So as to avoid protocol conversion processing at the time of transferring the retained data, the retained data in the base station 4 is transferred to the relay station 9 along with the retained data in the relay station 5 after having been transferred to the relay station 5.

Using a sequence number assigned to data, the relay station 5 and the relay station 9 notify each other of where data transmitted and received before the handover processing ends and where new data begins after the handover processing. The sequence number is independently managed between nodes. Therefore, even if the sequence numbers of data are compared between different nodes, it is difficult to understand the anteroposterior relationship of data. Therefore, at the time of the occurrence of handover processing, it is desirable that timing adjustment is performed on retained data transfer between base stations, retained data transfer between relay stations, and the reception of data newly received from the exchange 2 after the handover processing.

Using FIG. 13A, the outline of handover processing at the time of transmitting downlink data will be described. When the handover processing has occurred, the base station 4 starts transferring downlink retained data to the relay station 5 (S61). After the transfer processing for the downlink retained data has finished, the base station 4 notifies the relay station 5 of transfer completion. The relay station 5 having received a notice from the base station 4 starts transferring retained data to the relay station 9 (S62). After the transfer processing for the retained data has finished, the relay station 5 notifies the relay station 9 of transfer completion.

The relay station 9 having received the transfer completion notice notifies the exchange 2 and the mobile device 6 of data transfer completion. The exchange 2 having received the data transfer completion notice from the relay station 9 resumes transmitting to the mobile device 6. The exchange 2 transmits downlink data to the base station 8. The base station 8 transmits the received downlink data to the relay station 9 (S63). When having received the downlink data, the relay station 9 transmits, to the mobile device 6, data in order starting from old downlink retained data stored in a storage unit in the relay station 9 (S64). As a result, the mobile device 6 receives data including the downlink retained data in the relay station 9 and the downlink data transmitted from the exchange 2, in that order.

As described above, by controlling transfer processing for data retained in the base station 4 and the relay station 5, it may be possible to optimize data transmission to the mobile device 6 after the handover processing.

In FIG. 13B, during the transmission of data to the exchange 2, the relay station 5 performs processing for handing over from the relay station 5 to the relay station 9. When handover has occurred during the transmission of uplink data from the mobile device 6, uplink data is retained in the relay station 5.

Using FIG. 13B, the outline of handover processing at the time of the transmission of uplink data will be described. When the handover processing has occurred, the relay station 5 starts transferring the uplink retained data to the relay station 9 (S66). In addition, it is assumed that since the base station 4 is coupled to the exchange 2 by a wire, the retention of uplink data due to the handover processing does not occur.

After the completion of the transfer processing for the uplink retained data, the relay station 5 notifies the relay station 9 of transfer completion. The relay station 9 having received the transfer completion notice from the relay station 5 notifies the exchange 2 and the mobile device 6 of data transfer completion.

The mobile device 6 having received the data transfer completion notice from the relay station 9 resumes transmitting to the exchange 2. The mobile device 6 transmits uplink data to the relay station 9 (S67). When having received data, the relay station 9 transmits, to the base station 8, uplink retained data existing in the storage unit in the relay station 9, in chronological order (S68). The base station 8 transmits the received uplink retained data to the exchange 2. As a result, the exchange 2 receives data including the uplink retained data in the relay station 9 and the uplink data transmitted from the mobile device 6, in that order.

As described above, by controlling transfer processing for data retained in the base station 4 and the relay station 5, it may be possible to optimize data transmission to the exchange 2 after the handover processing.

Figure 14A:
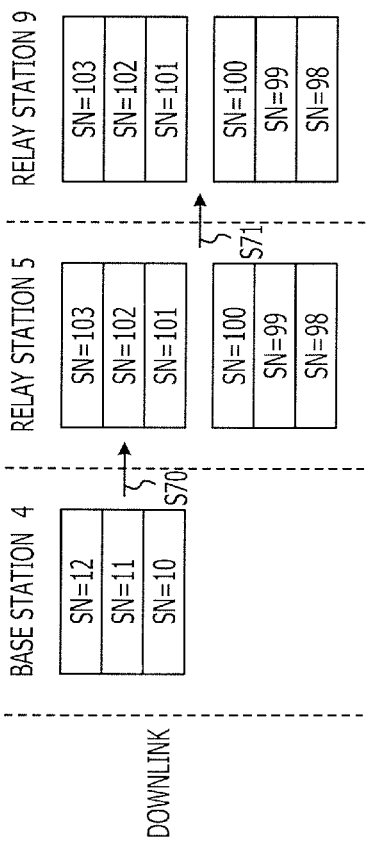
FIG. 14A illustrates a change in the sequence number of downlink retained data.
Figure 14B:
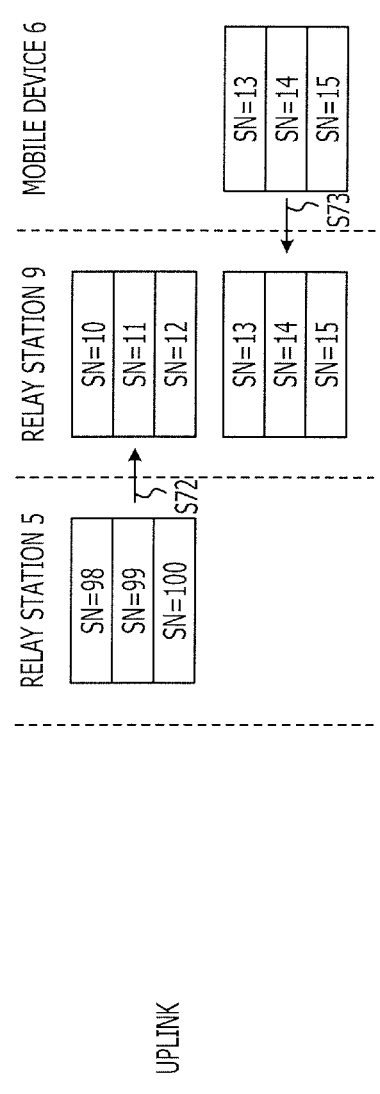
FIG. 14B illustrates the sequence number of uplink retained data.

FIGS. 14A and 14B illustrate changes in the sequence number of retained data in data transfer. FIG. 14A illustrates a change in the sequence number of downlink retained data. FIG. 14B illustrates the sequence number of uplink retained data.

In FIG. 14A, pieces of downlink retained data whose sequence numbers SN=10, 11, and 12 exist in the base station 4. Pieces of downlink retained data whose sequence numbers SN=98, 99, and 100 exist in the relay station 5. When the pieces of downlink retained data in the base station 4 have been transmitted to the relay station 5, sequence numbers are reassigned thereto (S70). New sequence numbers satisfy SN=101, 102, and 103 so as to follow data retained in the relay station 5.

The relay station 5 transfers the pieces of data of SN=98 to 103 to the relay station 9 (S71). By transmitting the pieces of downlink retained data in the base station 4 to the relay station 5 once and transferring the pieces of downlink retained data to the relay station 9 after having arranged the sequence numbers thereof, it may be possible to transfer to the relay station 9 with maintaining an anteroposterior relationship between pieces of data separately retained in the base station 4 and the relay station 5.

In FIG. 14B, the sequence numbers of pieces of uplink retained data retained in the relay station 5 satisfy SN=98, 99, and 100. So as to be transmitted to the base station 4, the sequence numbers have been converted, in the relay station 5, into numbers different from when having been received from the mobile device 6.

On the other hand, the sequence numbers of pieces of data not having been transmitted from the mobile device 6 satisfy SN=13, 14, and 15. Accordingly, if the data of the relay station 5 is transferred to the relay station 9 without change, in some cases the sequence numbers of pieces of uplink retained data in the relay station 5 become larger than the sequence numbers of pieces of data not having been transmitted from the mobile device 6, as in the present embodiment. As a result, order reversal occurs between the pieces of uplink retained data in the relay station 5 and the pieces of data not having been transmitted from the mobile device 6.

In order to avoid reversal of data, on the basis of the sequence numbers of the pieces of data not having been transmitted from the mobile device 6, the relay station 5 reassigns sequence numbers so that the sequence numbers satisfy SN=10, 11, and 12, before transferring the pieces of uplink retained data to the relay station 9. The relay station 5 transfers, to the relay station 9, the pieces of uplink retained data to which the sequence numbers have been reassigned (S72).

After having transferred the pieces of uplink retained data to the relay station 9, the mobile device 6 starts transmitting data to the relay station 9 (S73). Owing to this, it may be possible for the mobile device 6 to resume transmitting data to the exchange 2 with maintaining data order before the handover.

FIG. 15 is the sequence diagram of the wireless communication system 1b when the mobile device 6 is handed over from the relay station 5 to the relay station 9.

The mobile device 6 periodically transmits the measurement value of received signal power to the relay station 5 (S80). The relay station 5 executes determination processing for determining whether or not handover (HO) processing is to be performed (S190). When, as the result of the determination, having determined that the handover is desired, the relay station 5 outputs a handover (HO) request signal used for starting the handover processing, in accordance with the node configuration of a handover destination (S81). The base station 4 having received the handover request signal from the relay station 5 starts the handover processing, and transmits a handover request signal to the base station 8. The base station 8 having received the handover request signal from the base station 4 starts the handover processing, and transmits a handover request signal to the relay station 9.

When having received the handover request signal, the relay station 9 sets a path for data transfer and a channel, used for transferring, to the relay station 9, retained data retained in the relay station 5 (S82). When the setting of the path for data transfer and the channel has been completed, the relay station 9 transmits a handover response signal to the base station 8 (S83).

When having received the handover response signal, the base station 8 sets a path for data transfer and a channel, used for transferring retained data (S84). When the setting of the path for data transfer and the channel has been completed, the base station 8 transmits a handover response signal to the base station 4 (S85).

When having received the handover response signal, the base station 4 sets a path for data transfer and a channel, used for transferring retained data (S86). When the setting of the path for data transfer and the channel has been completed, the base station 4 transmits a handover response signal to the relay station 5 (S87).

When having received the handover response signal, the relay station 5 sets a path for data transfer and a channel, used for transferring retained data (S88). When the setting of the path for data transfer and the channel has been completed, the relay station 5 transmits, to the mobile device 6, a wireless channel resetting request signal used for switching the coupling destination of the mobile device 6 to the relay station 9 (S103).

After having transmitted the handover response signal, the base station 4 transmits downlink retained data to the relay station 5 (S89). In accordance with the downlink retained data in the relay station 5, the relay station 5 converts the format and the sequence number of the downlink retained data received from the base station 4. In addition, the relay station 5 converts the sequence number of the uplink retained data on the basis of the sequence number of the data of the mobile device 6, the data of the mobile device 6 not having been transmitted (S90).

After having transmitted the wireless channel resetting request signal, the relay station 5 notifies the relay station 9 of the sequence number of the final packet data of the retained data retained in the relay station 5 (S91). The relay station 9 having received the sequence number starts transfer monitoring processing for the retained data received from the relay station 5.

After having notified the relay station 9 of the sequence number, the relay station 5 starts transferring the retained data in the relay station 5 to the relay station 9 (S92). After having transferred all the retained data, the relay station 5 transmits, to the relay station 9, an EndMarker indicating the transfer completion of the retained data (S93). By receiving the EndMarker, the relay station 9 detects the transfer completion of the retained data transferred from the relay station 5.

When having received the resetting request signal for a wireless channel from the relay station 5 serving as a handover source, the mobile device 6 executes resetting processing for communicating with the relay station 9 serving as a handover destination (S104). When the resetting processing has been completed, the mobile device 6 transmits, to the relay station 9, a resetting completion notice signal indicating that the resetting processing has been completed (S94).

When having received a wireless channel resetting request signal from the mobile device 6, the relay station 9 transmits, to the exchange 2, a switching request signal used for switching a data transmission path, which leads from the mobile device 6 to the exchange 2, from the path for data transfer to a usual data transmission path (S95). The exchange 2 transmits, to the relay station 9, a switching response signal indicating that the data transmission path has been switched from the path for data transfer to the usual data transmission path (S96).

The relay station 9 having received a resource releasing instruction signal from the mobile device 6 resumes communication with the exchange 2 and the mobile device 6 (S97). When having received uplink data from the mobile device 6, the relay station 9 transmits stored uplink retained data to the exchange 2 first, and after that, transmits, to the exchange 2, uplink data received from the mobile device 6.

In addition, the relay station 9 releases the path for data transfer and the channel (S98). After the path for data transfer and the channel have been released, the relay station 9 transmits, to the base station 8, a resource releasing instruction signal instructing to release the path for data transfer and the channel (S99).

The base station 8 having received the resource releasing instruction signal resumes communication with the exchange 2 and the mobile device 6 (S105), and releases the path for data transfer and the channel (S106). After having released the path for data transfer and the channel, the base station 8 transmits, to the base station 4, a resource releasing instruction signal instructing to release the path for data transfer and the channel (S107).

The base station 4 having received the resource releasing instruction signal releases the path for data transfer and the channel (S100). After having released the path for data transfer and the channel, the base station 4 transmits, to the relay station 5, a resource releasing instruction signal instructing to release the path for data transfer and the channel (S101). When having received the resource releasing instruction signal, the relay station 5 releases the path for data transfer and the channel (S102).

As described above, after transferring data retained in the relay station 5 and the base station 4, which serve as handover sources, to the relay station 9 serving as a handover destination has been completed, the wireless communication system 1b resumes communication with the exchange 2 and the mobile device 6. Owing to this, it may be possible for the wireless communication system 1b to switch a base station and a relay station without generating the reordering of data.

In addition, after each node has performed release processing for a path for data transfer and a channel, a resource releasing instruction signal is transmitted to another node. Therefore, it may be possible to release a path and a channel, disused after transfer processing for retained data.

FIG. 16 is the processing flowchart diagram of the relay station 5 serving as a handover source, in the sequence diagram in FIG. 15. In the flowchart in FIG. 16, the same symbol is assigned to the same processing as in the sequence diagram. Using the flowchart in FIG. 16, processing in the relay station 5 will be described in more detail.

After the setting of a path used for retained data transfer has been completed (S88), the relay station 5 starts storing therein retained data transmitted from the base station 4 (S89). When the reception of the retained data has been completed (S89: YES), the relay station 5 refers to the final sequence number SN1 of data having already been received from the mobile device 6 before handover processing (S192). The final sequence number SN1 of data having already been received from the mobile device 6 has been recorded in an RLC protocol serving as a retransmission protocol, in the form of a state variable.

The relay station 5 refers to the final sequence number SN2 of data retained in the storage unit 50 (S193). The final sequence number SN2 of the retained data is a state variable in the RLC protocol. The relay station 5 calculates a difference between the SN1 and the SN2 (S194).

The relay station 5 reads uplink retained data from the storage unit 50 (S195). The relay station 5 removes IP/UDP/GTP-U serving as exchange protocols, from the read uplink retained data (S196). On the basis of the difference between the SN1 and the SN2, calculated earlier, the relay station 5 replaces a sequence number with respect to residual data after the removal of the exchange protocols (S197). Owing to the above-mentioned processing, the uplink retained data in the relay station 5 turns out to have a data format at the time of being received from the mobile device 6.

The relay station 5 transfers the retained data to the relay station 9 (S92). Until the transfer of all pieces of retained data is completed (S199: NO), the relay station 5 continues the transfer processing (S195 to S92). When the transfer of the retained data has been completed (S199: YES), the relay station 5 transmits an EndMarker (S93). After the transfer of the retained data has been completed, the relay station 5 releases the path for data transfer, which has become disused (S102).

As described above, it may be possible for the relay station 5 to convert the protocols and the sequence numbers of pieces of data retained in both of the base station 4 and the relay station 5, which serves as handover sources, and transfer the pieces of data to the base station 8 serving as a handover destination.

Figure 17A:
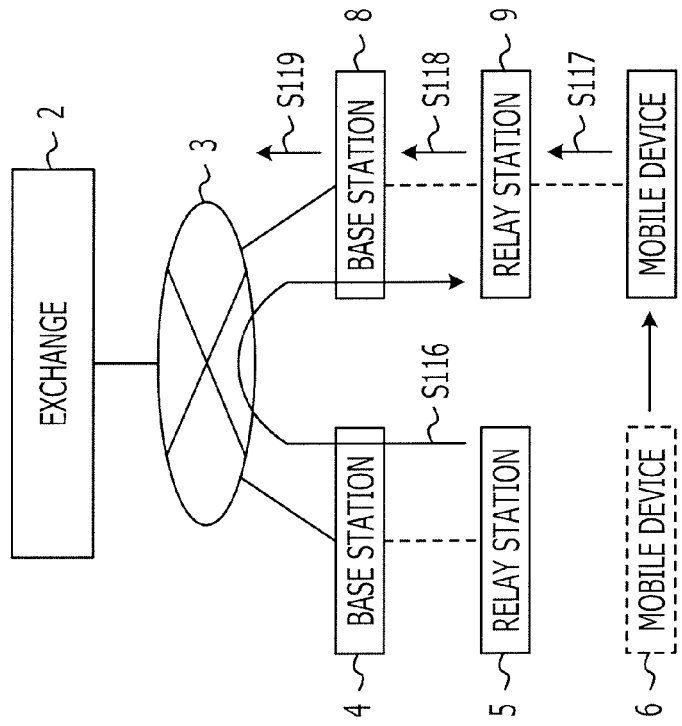
FIGS. 17A and 17B are schematic diagrams of data processing operations in individual nodes in the wireless communication system 1b.
Figure 17B:
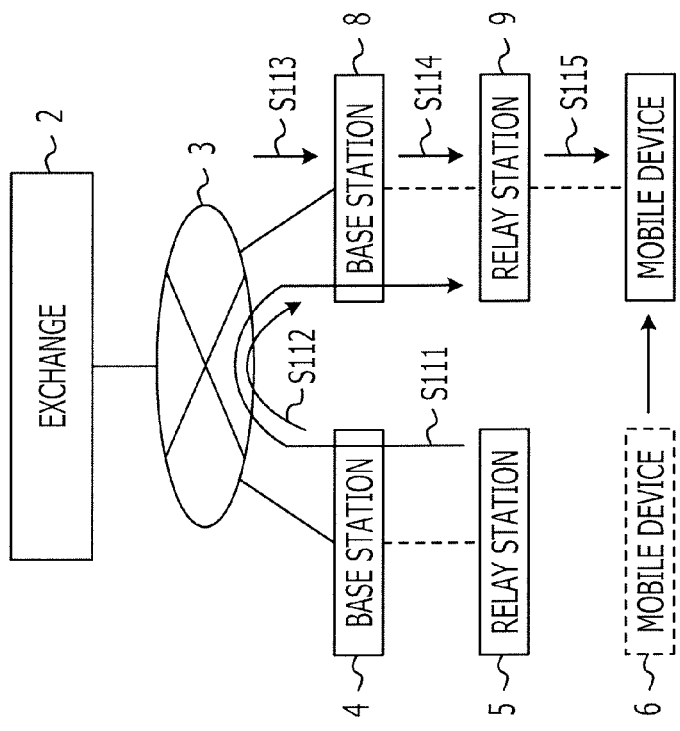

FIGS. 17A and 17B are the schematic diagrams of data processing operations in individual nodes in the wireless communication system 1b. While a node configuration is the same as in FIGS. 13A and 13B, pieces of retained data are transferred to a handover destination with being grouped together in a handover source in FIGS. 13A and 13B. On the other hand, in the present embodiment, pieces of data retained in a base station and a relay station, which serve as handover sources, are individually transferred to a base station and a relay station, which serve as handover destinations. By individually transferring pieces of retained data, it may be possible to reduce protocol conversion processing desired when pieces of retained data are grouped together.

FIG. 17A is a schematic diagram when handover processing has occurred during the transmission of data from the exchange 2 to the mobile device 6. FIG. 17B is a schematic diagram when handover processing has occurred during the transmission of data from the mobile device 6 to the exchange 2. In FIGS. 17A and 17B, the same number is assigned to the same member as in FIG. 1, and the description thereof will be omitted.

In FIG. 17A, during the reception of data from the exchange 2, the mobile device 6 performs processing for handing over from the relay station 5 to the relay station 9. When handover has occurred during the transmission of downlink data from the exchange 2, the downlink data is retained in the base station 4 and the relay station 5. The retention of data occurs in a wireless section. The downlink data retained in the base station 4 and the relay station 5 is called downlink retained data. The protocol of downlink data retained in the base station 4 is different from the protocol of downlink data retained in the relay station 5. So as to avoid protocol conversion processing at the time of data transfer, the downlink retained data in the base station 4 is transferred to the base station 8, and downlink retained data in the relay station 5 is transferred to the relay station 9.

Using FIG. 17A, the outline of handover processing at the time of transmitting downlink data will be described. When the handover processing has occurred, the relay station 5 starts transferring downlink retained data to the relay station 9 (S111). After the relay station 5 has started transferring downlink retained data, the base station 4 starts transferring downlink retained data (S112). The reason why the relay station 5 starts transfer processing in first is that since a section between a relay station and a base station is a wireless section, it is highly likely that data transfer between relay stations takes a longer time than data transfer between base stations.

After the transfer processing for the retained data has been completed, the relay station 5 notifies the base station 8 of transfer completion. When the base station 8 has received the transfer completion notice from the relay station 5 and the transfer of the downlink retained data from the base station 4 to the base station 8 has been completed, the base station 8 notifies the exchange 2 and the mobile device 6 of a switching request.

The exchange 2 having received the switching request notice from the base station 8 resumes communication with the mobile device 6. The exchange 2 transmits downlink data to the base station 8 (S113). The downlink data transmitted to the base station 8 pushes out downlink retained data existing in a storage unit in the base station 8 (S114). The downlink retained data pushed out from the base station 8 pushes out downlink retained data existing in the storage unit in the relay station 9 (S115). As a result, the mobile device 6 receives data including the downlink retained data in the relay station 9, the downlink retained data in the base station 8, and the downlink data transmitted from the exchange 2, in that order.

As described above, by controlling transfer processing for data retained in the base station 4 and the relay station 5, it may be possible to optimize data transmission to the mobile device 6 after the handover processing.

In FIG. 17B, during the transmission of data to the exchange 2, the mobile device 6 performs processing for handing over from the relay station 5 to the relay station 9. In when handover has occurred during the transmission of uplink data from the mobile device 6, uplink data is retained in the base station 4 and the relay station 5. The protocol of uplink data retained in the base station 4 is different from the protocol of uplink data retained in the relay station 5. So as to avoid protocol conversion processing, the uplink retained data in the base station 4 is transferred to the base station 8, and the uplink retained data in the relay station 5 is transferred to the relay station 9.

Using FIG. 17B, the outline of handover processing at the time of the transmission of uplink data will be described. When the handover processing has occurred, the relay station 5 starts transferring the uplink retained data to the relay station 9 (S116). In addition, it is assumed that since the base station 4 is coupled to the exchange 2 by a wire, the retention of uplink data due to the handover processing does not occur.

After the completion of the transfer processing for the retained data, the relay station 5 gives notice to the base station 8. The base station 8 having received a transfer completion notice from the relay station 5 notifies the exchange 2 and the mobile device 6 of a switching request.

The mobile device 6 having received the switching request notice from the base station 8 resumes communication with the exchange 2. The mobile device 6 transmits uplink data to the relay station 9 (S117). The uplink data transmitted to the relay station 9 pushes out uplink retained data existing in the storage unit in the relay station 9 (S118). The uplink retained data pushed out from the relay station 9 is transmitted to the exchange 2 through the base station 8 (S119). As a result, the exchange 2 receives data including the uplink retained data in the relay station 9 and the uplink data transmitted from the mobile device 6, in that order.

As described above, by controlling transfer processing for data retained in the base station 4 and the relay station 5, it may be possible to optimize data transmission to the exchange 2 after the handover processing.

Figure 18A:
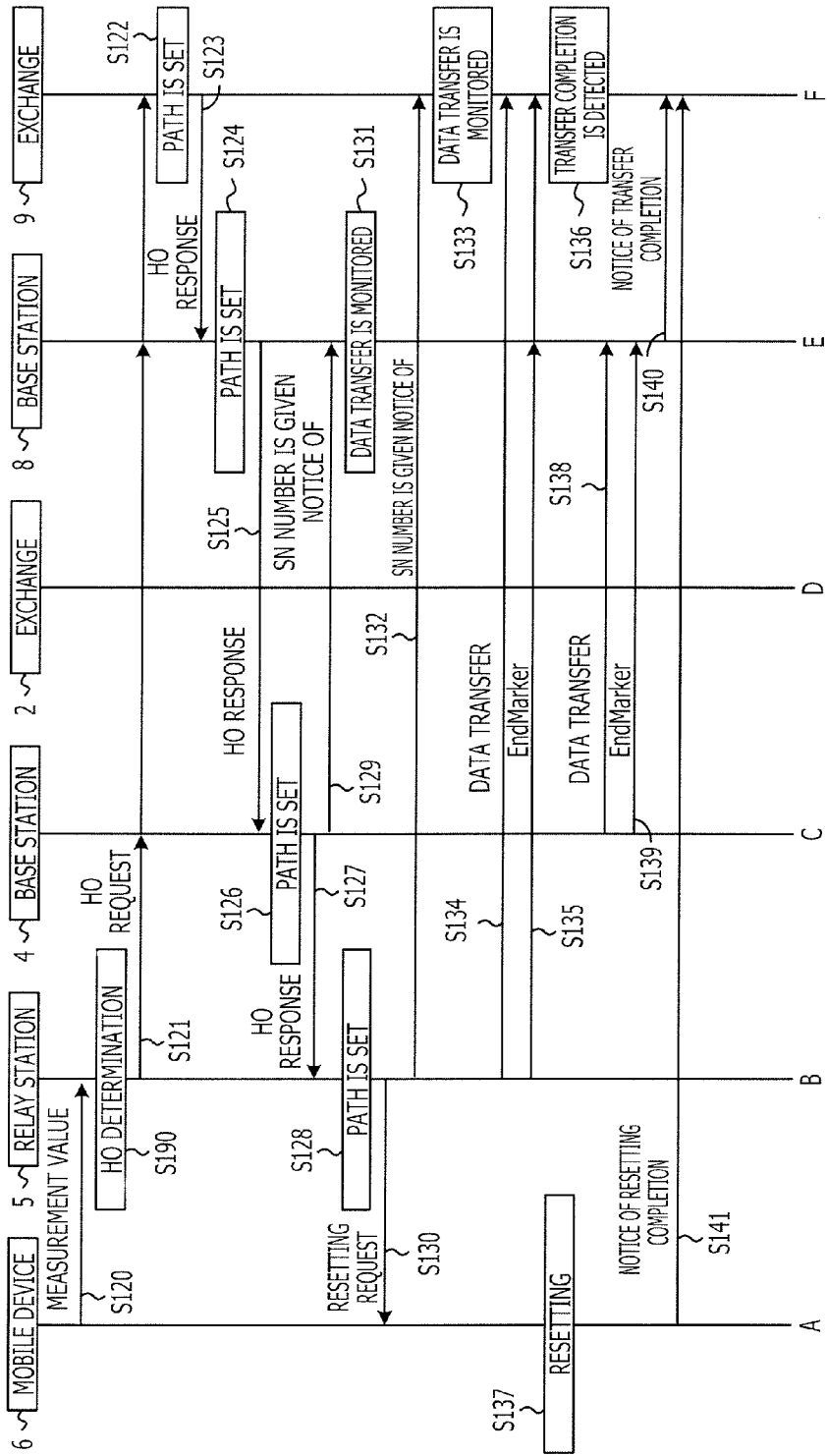
FIGS. 18A and 18B are first sequence diagrams when data transfer processing operations in FIGS. 17A and 17B are performed in the wireless communication system 1b.
Figure 18B:
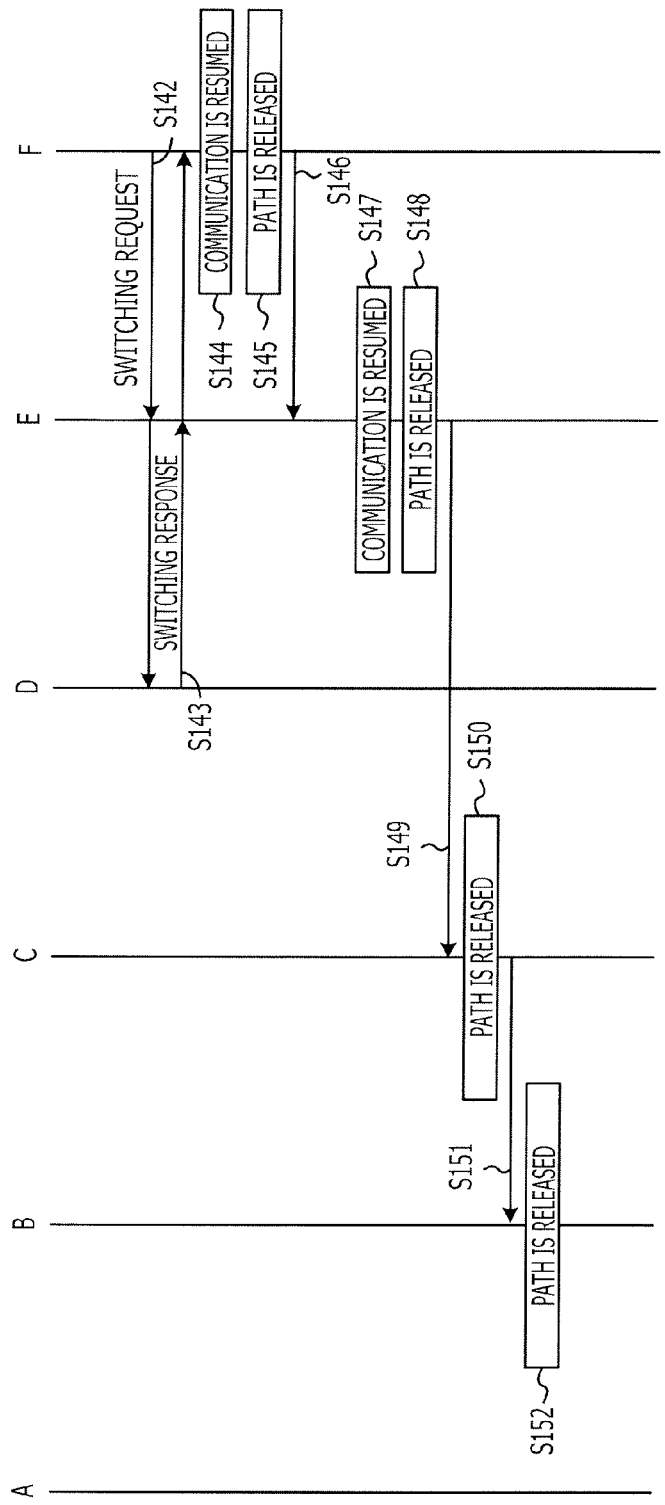

FIGS. 18A and 18B are first sequence diagrams when data transfer processing operations in FIGS. 17A and 17B are performed in the wireless communication system 1b.

The mobile device 6 periodically transmits the measurement value of received signal power to the relay station 5 (S120). The relay station 5 executes determination processing for determining whether or not handover (HO) processing is to be performed (S190). When, as the result of the determination, having determined that the handover is desired, the relay station 5 outputs a handover (HO) request signal used for starting the handover processing, in accordance with the node configuration of a handover destination (S121). The base station 4 having received the handover request signal from the relay station 5 starts the handover processing, and transmits a handover request signal to the base station 8. The base station 8 having received the handover request signal from the base station 4 starts the handover processing, and transmits a handover request signal to the relay station 9.

When having received the handover request signal, the relay station 9 sets a path for data transfer and a channel, used for transferring, to the relay station 9, retained data retained in the relay station 5 (S122). When the setting of the path for data transfer and the channel has been completed, the relay station 9 transmits a handover response signal to the base station 8 (S123).

When having received the handover response signal, the base station 8 sets a path for data transfer and a channel, used for transferring retained data (S124). When the setting of the path for data transfer and the channel has been completed, the base station 8 transmits a handover response signal to the base station 4 (S125).

When having received the handover response signal, the base station 4 sets a path for data transfer and a channel, used for transferring retained data (S126). When the setting of the path for data transfer and the channel has been completed, the base station 4 transmits a handover response signal to the relay station 5 (S127).

The base station 4 transmits the handover response signal and notifies the base station 8 of the sequence number (SN) of the final packet data of the retained data retained in the base station 4 (S129). The base station 8 having received the sequence number starts transfer monitoring processing for the retained data received from the base station 4 (S131).

When having received the handover response signal, the relay station 5 sets a path for data transfer and a channel, used for transferring retained data retained in the relay station 5 to the relay station 9 (S128). When the setting of the path for data transfer and the channel has been completed, the relay station 5 transmits, to the mobile device 6, a wireless channel resetting request signal used for switching the coupling destination of the mobile device 6 to the relay station 9 (S130).

After having transmitted the wireless channel resetting request signal, the relay station 5 notifies the relay station 9 of the sequence number of the final packet data of the retained data retained in the relay station 5 (S132). The relay station 9 having received the sequence number starts transfer monitoring processing for the retained data received from the relay station 5 (S133).

After having notified the relay station 9 of the sequence number, the relay station 5 starts transferring the retained data in the relay station 5 to the relay station 9 (S134). After having transferred all the retained data, the relay station 5 transmits, to the base station 8 and the relay station 9, an EndMarker indicating the transfer completion of the retained data (S135).

By receiving the EndMarker, the relay station 9 detects the transfer completion of the retained data transferred from the relay station 5 (S136). The relay station 9 waits until processing for transferring retained data from the base station 4 to the base station 8 is completed.

The base station 4 starts transferring the retained data to the base station 8 (S138). After having transferred all the retained data, the base station 4 transmits, to the base station 8, an EndMarker indicating the transfer completion of the retained data (S139).

After the completion of the reception of the retained data in the base station 4, the base station 8 receives the EndMarker from the base station 4. When having received the EndMarkers from both of the relay station 5 and the base station 4, the base station 8 transmits, to the relay station 9, a transfer completion notice signal indicating that the transfer of all pieces of retained data has been completed (S140).

When having received the resetting request signal for a wireless channel from the relay station 5 serving as a handover source, the mobile device 6 executes resetting processing for communicating with the relay station 9 serving as a handover destination (S137). When the resetting processing has been completed, the mobile device 6 transmits, to the relay station 9, a resetting completion notice signal indicating that the resetting processing has been completed (S141).

When having received the transfer completion notice signal from the base station 8 and the wireless channel resetting request signal from the mobile device 6, the relay station 9 transmits, to the base station 8 and the exchange 2, a switching request signal used for switching a data transmission path leading to the exchange 2, from the path for data transfer to a usual data transmission path (S142). The exchange 2 and the base station 8 transmit, to the relay station 9, switching response signals each of which indicates that the data transmission path has been switched from the path for data transfer to the usual data transmission path (S143).

The relay station 9 having received a resource releasing instruction signal resumes communication with the exchange 2 and the mobile device 6 (S144). When having received uplink data from the mobile device 6, the relay station 9 transmits stored uplink retained data to the base station 8 first, and after that, transmits, to the base station 8, uplink data received from the mobile device 6. In addition, when having received downlink data from the base station 8, the relay station 9 transmits stored downlink retained data to the mobile device 6 first, and after that, transmits, to the mobile device 6, downlink data received from the base station 8.

In addition, the relay station 9 releases the path for data transfer and the channel (S145). After the path for data transfer and the channel have been released, the relay station 9 transmits, to the base station 8, a resource releasing instruction signal instructing to release the path for data transfer and the channel (S146).

The base station 8 having received the resource releasing instruction signal resumes communication with the exchange 2 and the mobile device 6 (S147). When having received downlink data from the exchange 2, the base station 8 transmits stored downlink retained data to the relay station 9 first, and after that, transmits, to the relay station 9, downlink data received from the exchange 2. In addition, the base station 8 releases the path for data transfer and the channel (S148). After the path for data transfer and the channel have been released, the base station 8 transmits, to the base station 4, a resource releasing instruction signal instructing to release the path for data transfer and the channel (S149).

When having received the resource releasing instruction signal, the base station 4 releases the path for data transfer and the channel (S150). After the path for data transfer and the channel have been released, the base station 4 transmits, to the relay station 5, a resource releasing instruction signal instructing to release the path for data transfer and the channel (S151).

When having received the resource releasing instruction signal, the relay station 5 releases the path for data transfer and the channel (S152). As described above, in the present embodiment, after transferring data retained in the relay station 5 and the base station 4, which serve as handover sources, to the relay station 9 and the base station 8, which serve as handover destinations, has been completed, the wireless communication system 1b resumes communication with the exchange 2 and the mobile device 6. Owing to this, it may be possible for the wireless communication system 1b to switch a base station and a relay station without generating the reordering of data.

In addition, after each node has performed release processing for a path for data transfer and a channel, a resource releasing instruction signal is transmitted to another node. Therefore, it may be possible to release a path and a channel, disused after transfer processing for retained data.

Figure 19:
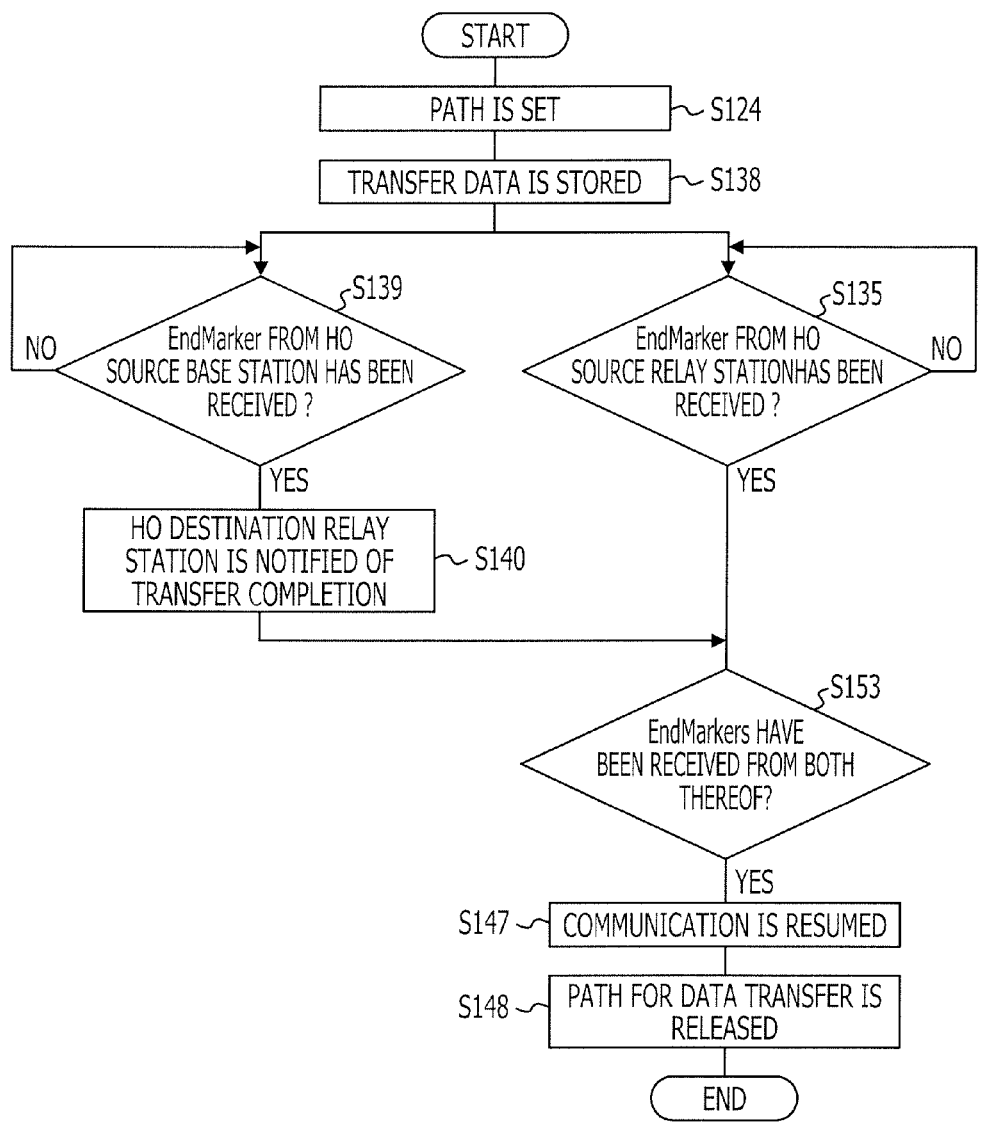
FIG. 19 is a processing flowchart diagram of a base station serving as a handover destination, in the sequence diagram in FIGS. 18A and 18B.

FIG. 19 is the processing flowchart diagram of the base station 8 serving as a handover destination, in the sequence diagram in FIGS. 18A and 18B. In the flowchart in FIG. 19, the same symbol is assigned to the same processing as in the first sequence diagram. Using the flowchart in FIG. 19, processing in the base station 8 will be described in more detail.

After the setting of a path used for retained data transfer has been completed (S124), the base station 8 starts storing therein retained data transferred from the base station 4 (S138). The base station 8 waits for an EndMarker to be transmitted from the base station 4 serving as the base station of a handover source, the EndMarker indicating the transfer completion of retained data (S139). When having received the EndMarker (S139: YES), the base station 8 transmits a transfer completion notice signal to the relay station 9 serving as a handover destination (S140). In addition, the base station 8 waits for an EndMarker to be transmitted from the relay station 5 serving as the relay station of a handover source, the EndMarker indicating the transfer completion of retained data (S135).

When having received the EndMarkers from both of the base station 4 and the relay station 5, which serve as handover sources (S153: YES), the base station 8 resumes communication with the exchange 2 and the mobile device 6 (S147). In addition, the base station 8 releases the path for data transfer, which has become disused (S148).

As described above, by receiving the EndMarkers from both of the base station 4 and the relay station 5, which serve as handover sources, it may be possible for the base station 8 to monitor the transfer completion of retained data in the base station 4 and the relay station 5.

FIGS. 20A and 20B are second sequence diagrams when data transfer processing operations in FIGS. 17A and 17B are performed in the wireless communication system 1b. In the second sequence diagram, the same symbol is assigned to the same processing step as in the first sequence diagram in FIGS. 18A and 18B, and the description thereof will be omitted.

In the transfer of retained data from the relay station 5 to the relay station 9, when having received, from the relay station 5, an EndMarker indicating the transfer completion of data (S160), the base station 8 suspends transfer to the relay station 9 (S161). By receiving the EndMarker, the base station 8 detects the completion of the transfer of retained data from the relay station 5 to the relay station 9.

The base station 8 stores therein retained data transferred from the base station 4 (S138), and when having received an EndMarker indicating transfer completion (S139), the base station 8 transmits, to the relay station 9, the EndMarker received from the relay station 5 and suspended (S162).

As described above, in the processing in the second sequence diagram, the EndMarker transferred from the base station 4 to the base station 8 serves as a trigger to transfer the EndMarker that has been received from the relay station 5 and held in the base station 8. Owing to this, it may be possible for the relay station 9 to recognize that the transfer of all pieces of retained data in the relay station 5 and the base station 4 has been completed.

Figure 21A:
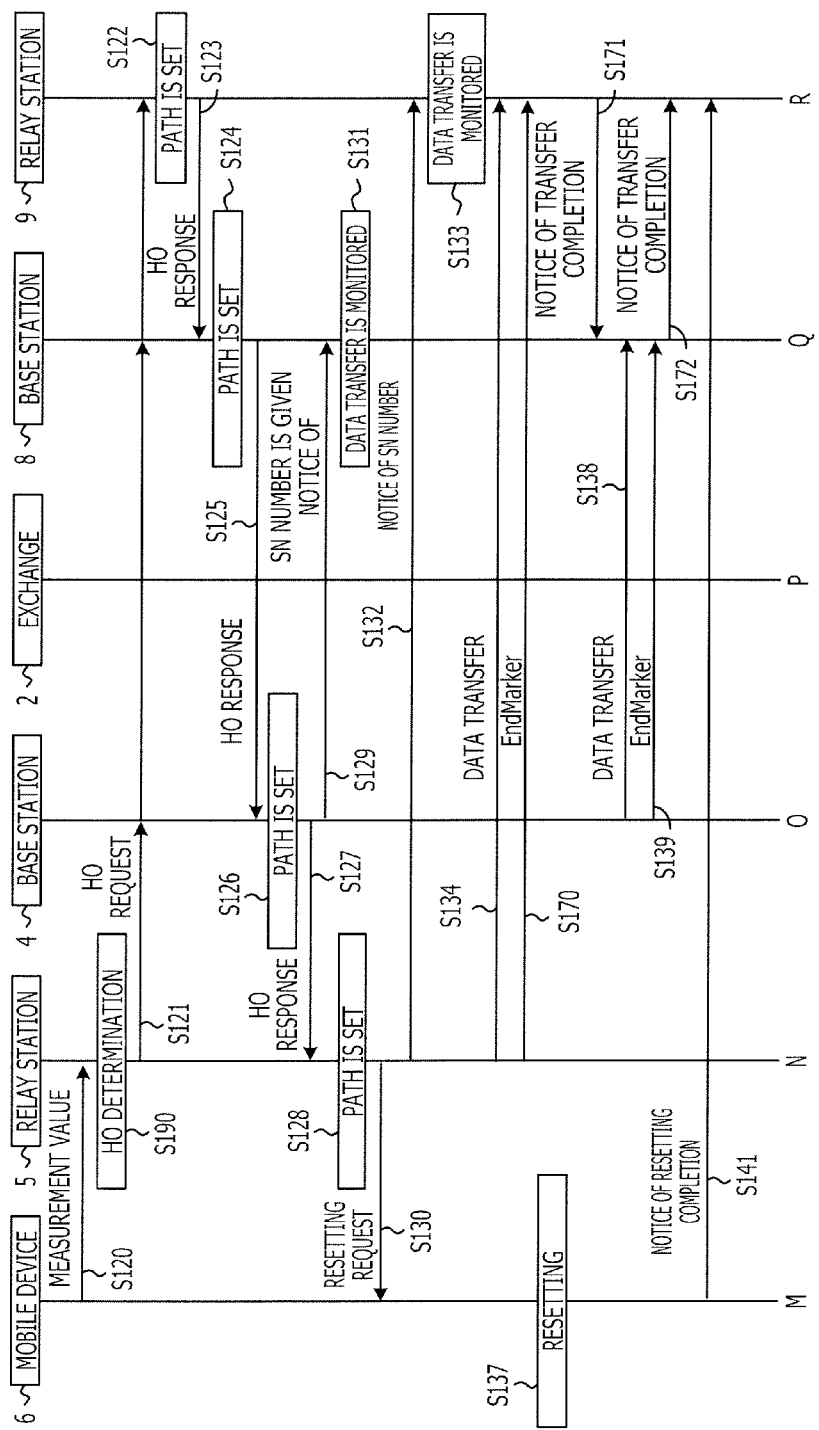

FIGS. 21A and 21B are third sequence diagrams when data transfer processing operations in FIGS. 17A and 17B are performed in the wireless communication system 1b. In the third sequence diagram, the same symbol is assigned to the same processing step as in the first sequence diagram in FIGS. 18A and 18B, and the description thereof will be omitted.

In the transfer of retained data from the relay station 5 to the relay station 9, when having received, from the relay station 5, an EndMarker indicating the transfer completion of data (S170), the relay station 9 transmits a transfer completion notice signal to the base station 8 (S171). In addition, in the transfer of retained data from the base station 4 to the base station 8, when having received, from the base station 4, an EndMarker indicating the transfer completion of data (S139), the base station 8 transmits a transfer completion notice signal to the relay station 9 (S172).

As described above, in the processing in the third sequence diagram, the base station 8 having received the completion notice of retained data transfer between relay stations notifies the relay station 9 of the completion of data transfer as soon as retained data transfer between base stations is completed. Owing to this, it may be possible for the relay station 9 to recognize that the transfer of all pieces of retained data in the relay station 5 and the base station 4 has been completed.

Figure 22:
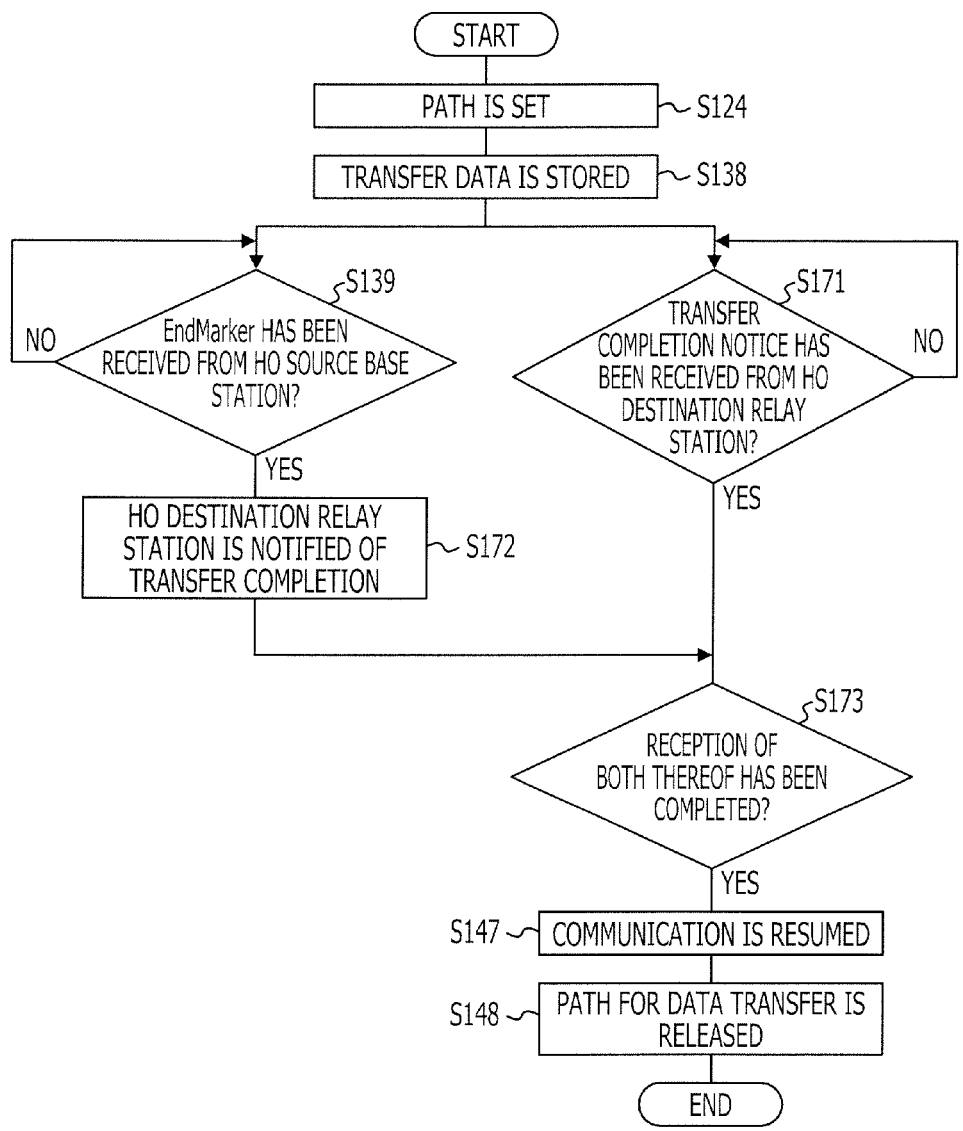
FIG. 22 is a processing flowchart diagram of a base station serving as a handover destination, in the third sequence diagram in FIGS. 21A and 21B.

FIG. 22 is the processing flowchart diagram of the base station 8 serving as a handover destination, in the third sequence diagram in FIGS. 21A and 21B. In the flowchart in FIG. 22, the same symbol is assigned to the same processing as in the third sequence diagram in FIGS. 21A and 21B. Using the flowchart in FIG. 22, processing in the base station 8 will be described in more detail.

After the setting of a path used for retained data transfer has been completed (S124), the base station 8 starts storing therein retained data transferred from the base station 4 (S138). The base station 8 waits for an EndMarker to be transmitted from the base station 4 serving as the base station of a handover source, the EndMarker indicating the transfer completion of retained data (S139). When having received the EndMarker (S139: YES), the base station 8 transmits a transfer completion notice signal to the relay station 9 serving as a handover destination (S172). In addition, the base station 8 waits for a transfer completion notice signal to be transmitted from the relay station 5 serving as the base station of a handover source, the transfer completion notice signal indicating the transfer completion of retained data (S171).

When both of the reception of the EndMarker from the base station 4 and the reception of the transfer completion notice signal from the relay station 9 have been completed (S173: YES), the base station 8 resumes communication with the exchange 2 and the mobile device 6 (S147). In addition, the base station 8 releases the path for data transfer, which has become disused (S148).

As described above, by receiving both of the EndMarker transmitted from the base station 4 and the transfer completion notice signal transmitted from the relay station 9, it may be possible for the base station 8 to monitor the transfer completion of retained data in the base station 4 and the relay station 5.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a first base station coupled to an exchange;
a first relay station configured to perform wireless communication of data including a sequence number indicating a transmission order, the first relay station configured to communicate with the first base station and a mobile device,
wherein
the first relay station receives first data with a first sequence number from the first base station, renumbers the first sequence number into a second sequence number, and stores the first data with the second sequence number into a storage,
the first relay station selects a first node as a handover destination, and
when the first node is a second base station coupled to the exchange, the first relay station is further configured to:
receive second data with a third sequence number from the first base station;
renumber the third sequence number into a fourth sequence number such that the second sequence number and the fourth sequence number are sequentially ordered; and
transmit the first data with the second sequence number and the second data with the fourth sequence number to the second base station.

2. The wireless communication system according to claim 1, wherein
when the first node includes a third base station coupled to the exchange, and a second relay station configured to perform wireless communication with the mobile device and with the third base station, the first relay station is further configured to:
receive third data with a fifth sequence number from the first base station,
renumber the fifth sequence number into a sixth sequence number such that the second sequence number and the sixth sequence number are sequentially ordered; and
transmit the first data with the second sequence number and the third data with the sixth sequence number to the second relay station.

3. The wireless communication system according to claim 1, wherein
the first base station includes a second storage, and
when the first node includes a third base station coupled to the exchange, and a second relay station configured to perform wireless communication with the mobile device and with the third base station, the first base station is configured to transmit fourth data stored in the storage to the third base station, and the first relay station is further configured to transmit the first data to the second relay station.

4. The wireless communication system according to claim 1, wherein
the first relay station is further configured to:
receive fifth data with a seventh sequence number from the mobile device, renumber the seventh sequence number into an eighth sequence number and store the fifth data with the eighth sequence number into the first storage, select a second node as a handover destination, and
transmit the fifth data with the seventh sequence number to the second node.

5. A relay station configured to perform wireless communication with a mobile device and with a first base station coupled to an exchange, the relay station comprising:
a first interface configured to:
receive first data from the first base station including a first sequence number indicating a transmission order; and
renumber the first sequence number into a second sequence number; and
a storage configured to store the first data with the second sequence number, wherein
when a second base station coupled to the exchange is selected as a handover destination, the first interface is configured to:
receive second data with a third sequence number from the first base station;
renumber the third sequence number into a fourth sequence number such that the second sequence number and the fourth sequence number are sequentially ordered;
and transmit the first data with the second sequence number and the second data with the fourth sequence number to the second base station.

6. The relay station according to claim 5, wherein
when a third base station coupled to the exchange, and a second relay station configured to perform wireless communication with the mobile device and with the third base station are selected as a handover destination, the first interface is further configured to receive third data with a fifth sequence number from the first base station,
renumber the fifth sequence number into a sixth sequence number such that the second sequence number and the sixth sequence number are sequentially ordered;
and the first data with the second sequence number and the third data with the sixth sequence number to the second relay station.

7. The relay station according to claim 5, further comprising:
a second interface configured to:
receive fourth data with a seventh sequence number from the mobile device; and
renumber the seventh sequence number into an eight sequence number
wherein
the storage is further configured to store the fourth data with an eighth sequence number, and
when a first node is selected as a handover destination, the first interface is further configured to transmit the fourth data with the seventh sequence number to the first node.

8. A wireless communication method executed by a system including a relay station configured to perform wireless communication of data including a sequence number indicating a transmission order, with a mobile device and with a first base station coupled to an exchange, the method comprising:
transmitting first data with a first sequence number from the first base station to the first relay station;
renumbering the first data with the first sequence number into a second sequence number;
storing the first data with a second sequence number into the first relay;
selecting a first node as a handover destination; and
when the first node is a second base station coupled to the exchange, transmitting second data with a third sequence number from the first base station to the first relay station,
renumbering the third sequence number of the second data into a fourth sequence number such that the second sequence number and the fourth sequence number are sequentially ordered
and transmitting the first data with the second sequence number and the second data with a fourth sequence number to the second base station.

9. The wireless communication method according to claim 8, wherein
when the first node includes a third base station coupled to the exchange, and a second relay station configured to perform wireless communication with the mobile device and with the third base station, the first relay station
receives third data with a fifth sequence number from the first base station,
renumbers the fifth sequence number into a sixth sequence number such that the second sequence number and the sixth sequence number are sequentially ordered; and
transmits the first data with the second sequence number and the third data with the sixth sequence number to the second relay station.

10. The wireless communication method according to claim 8, wherein
when the first node includes a third base station coupled to the exchange, and a second relay station configured to perform wireless communication with the mobile device and with the third base station, the first base station transmits fourth data stored in the first base station to the third base station, and the first relay station transmits the first data to the second relay station.

11. The wireless communication method according to claim 8, further comprising:
transmitting fifth data with a seventh sequence number from the mobile device to the first relay station;
renumbering the seventh sequence number into an eighth sequence number;
storing the fifth data with the eighth sequence number into the first relay station;
selecting a second node as a handover destination; and
transmitting the fifth data with the seventh sequence number from the first relay station to the second node.

* * * * *